United States Patent
Chen et al.

(10) Patent No.: US 12,189,065 B2
(45) Date of Patent: Jan. 7, 2025

(54) INTERACTIVE SENSOR CALIBRATION FOR AUTONOMOUS VEHICLES

(71) Applicant: NVIDIA CORPORATION, Santa Clara, CA (US)

(72) Inventors: Chen Chen, San Jose, CA (US); Ziqiang Huang, Palo Alto, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 593 days.

(21) Appl. No.: 16/919,222

(22) Filed: Jul. 2, 2020

(65) Prior Publication Data

US 2021/0003683 A1 Jan. 7, 2021

Related U.S. Application Data

(60) Provisional application No. 62/870,655, filed on Jul. 3, 2019.

(51) Int. Cl.
| | | |
|---|---|---|
| *G01S 7/497* | (2006.01) | |
| *E21B 23/06* | (2006.01) | |
| *E21B 43/12* | (2006.01) | |
| *G01S 17/89* | (2020.01) | |
| *G01S 17/931* | (2020.01) | |
| *G05D 1/00* | (2024.01) | |

(52) U.S. Cl.
CPC .............. *G01S 7/497* (2013.01); *E21B 23/06* (2013.01); *E21B 43/128* (2013.01); *G01S 17/89* (2013.01); *G01S 17/931* (2020.01); *G05D 1/0246* (2013.01)

(58) Field of Classification Search
CPC .............................. G01S 7/497; G01S 7/4972
See application file for complete search history.

(56) References Cited

U.S. PATENT DOCUMENTS

| | | | | |
|---|---|---|---|---|
| 10,169,678 | B1* | 1/2019 | Sachdeva | G06F 3/011 |
| 10,491,885 | B1* | 11/2019 | Hicks | G06V 20/56 |
| 2007/0130239 | A1* | 6/2007 | Wheeler | G06V 20/64 |
| | | | | 708/130 |
| 2014/0132723 | A1* | 5/2014 | More | G01S 7/497 |
| | | | | 348/46 |
| 2018/0313940 | A1* | 11/2018 | Wu | G06T 7/13 |
| 2020/0018852 | A1* | 1/2020 | Walls | G06T 7/11 |

(Continued)

FOREIGN PATENT DOCUMENTS

WO WO2019025035 A1 * 2/2019

OTHER PUBLICATIONS

Castorena et al., "Autocalibration of LIDAR and Optical Cameras via Edge Alignment" (Year: 2016).*

(Continued)

*Primary Examiner* — Yuqing Xiao
*Assistant Examiner* — Zhengqing Qi
(74) *Attorney, Agent, or Firm* — Maschoff Brennan

(57) ABSTRACT

A method includes obtaining first user input identifying at least one LIDAR point in a set of LIDAR points associated with an object in an image, and obtaining second user input identifying the object in the image. The method may also include generating a constraint on a relationship between a LIDAR sensor used to capture the set of LIDAR points and a camera used to capture the image. The method may additionally include reducing a cost associated with the LIDAR point being inconsistent with the object in the image subject to the constraint.

27 Claims, 20 Drawing Sheets

(56) References Cited

U.S. PATENT DOCUMENTS

2020/0167603 A1* 5/2020 Ung ............................ G06T 7/70
2020/0174107 A1* 6/2020 Briggs .................... H04N 23/90

OTHER PUBLICATIONS

D. Scaramuzza, A. Harati and R. Siegwart, "Extrinsic self calibration of a camera and a 3D laser range finder from natural scenes," 2007 IEEE/RSJ International Conference on Intelligent Robots and Systems, San Diego, CA, USA, 2007, pp. 4164-4169. (Year: 2007).*
Gong et al., "3D LIDAR-camera extrinsic calibration using an arbitrary trihedron," Sensors 2013, 13, 1902-1918. (Year: 2013).*
Castorena et al., "Autocalibration of LIDAR and Optical Cameras via Edge Alignment," 2016 IEEE International Conference on Acoustics, Speech and Signal Processing (ICASSP), Mar. 1, 2016, pp. 2862-2866. (Year: 2016).*
Mikolajczyk et al., "Shape recognition with edge-based features." British Machine Vision Conference (BMVC '03), Sep. 2003, Norwich, United Kingdom. pp. 779788. (Year: 2003).*

* cited by examiner

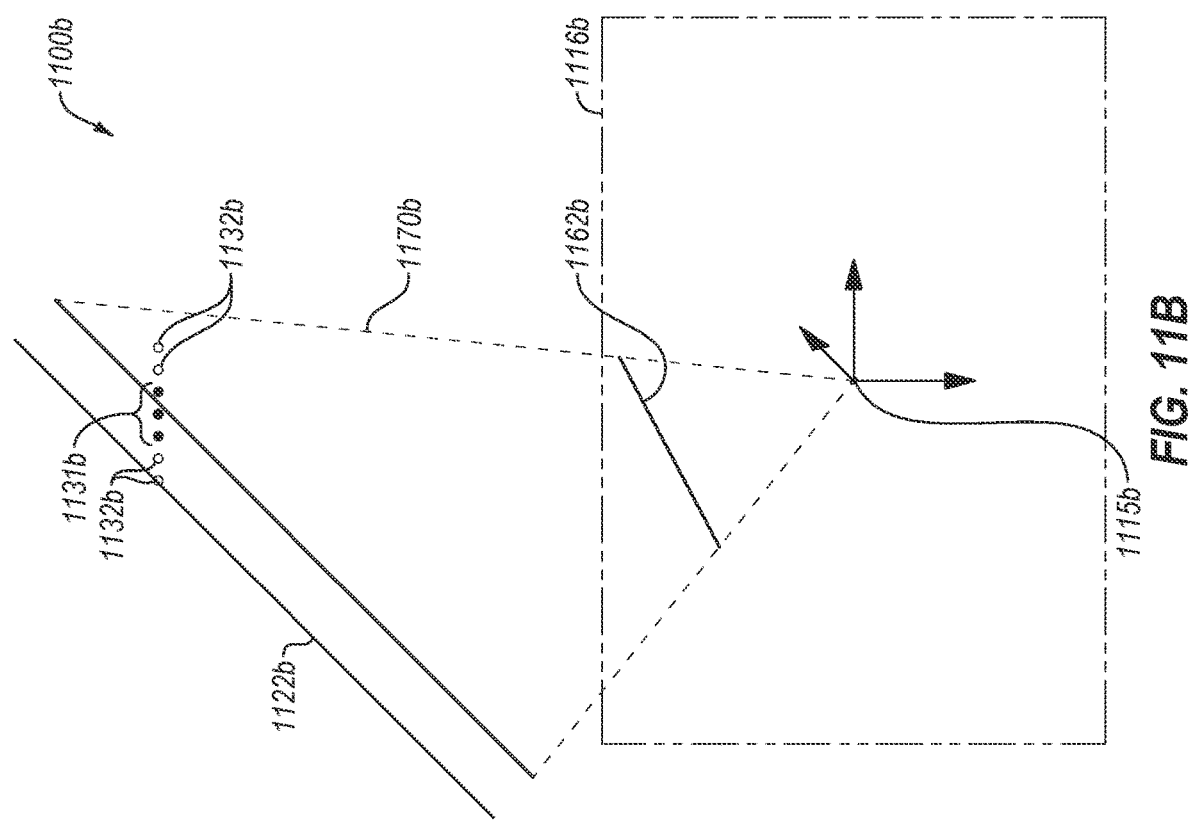

INTERACTIVE SENSOR CALIBRATION FOR AUTONOMOUS VEHICLES

CROSS-REFERENCE TO RELATED APPLICATION

This patent application claims the benefit of and priority to U.S. Provisional App. No. 62/870,655 filed Jul. 3, 2019, which is incorporated by reference in the present disclosure in its entirety.

FIELD

The embodiments discussed herein are related to interactive sensor calibration for autonomous vehicles.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or otherwise may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include obtaining first user input identifying at least one LIDAR point in a set of LIDAR points associated with an object in an image, and obtaining second user input identifying the object in the image. The method may also include generating a constraint on a relationship between a LIDAR sensor used to capture the set of LIDAR points and a camera used to capture the image. The method may additionally include reducing a cost associated with the LIDAR point being inconsistent with the object in the image subject to the constraint.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 11A-11B illustrate various examples of 2D-3D correlations;

DESCRIPTION OF EMBODIMENTS

Overview

Figure 1:
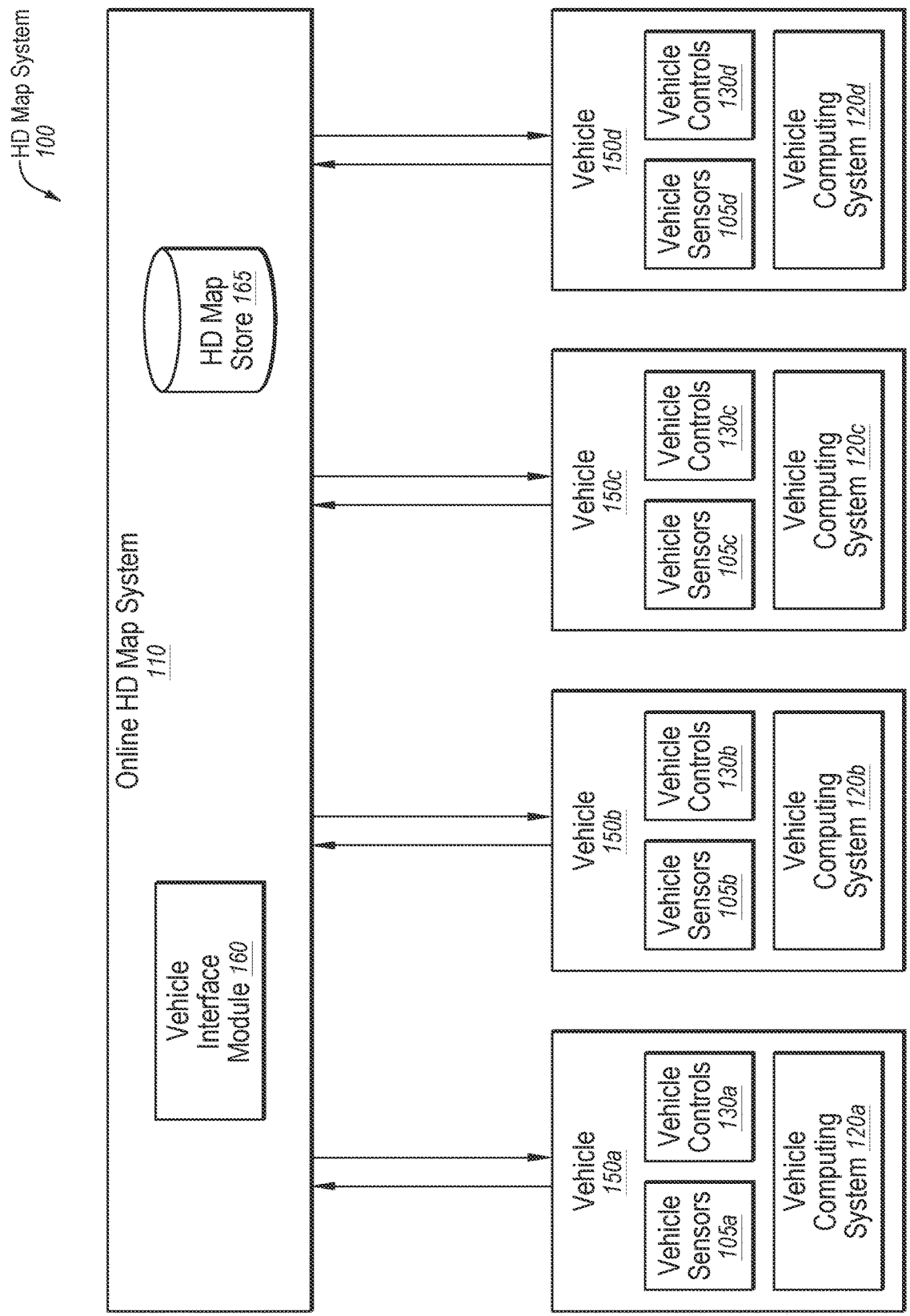
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure relate to manual calibration of a LIDAR and camera sensors of an autonomous vehicle to facilitate the autonomous vehicle in navigating and/or otherwise observing its surroundings. To verify a LIDAR to camera calibration, LIDAR points may be projected onto a camera image and it may be observed if the projection is accurate. To measure accuracy, the matching between physical or intensity edges from LIDAR points and the edges in camera edges may be determined. In the present disclosure, rather than manually adjusting the six degrees of freedom transform directly (which may be very difficult and time exhaustive, taking a trained engineer around twenty minutes to an hour to calibrate one transform), a user may be asked to pick matches or identify where matches are expected to be between the LIDAR points and the camera image. These user selections may be used as constraints in solving for and/or improving the transform between the LIDAR sensor and camera.

In some embodiments, a user may be presented with an interface that includes LIDAR points overlaid on an image as captured by a LIDAR and camera sensor of the autonomous vehicle. The user may select one or more of the LIDAR points as being associated with an object in the image, such as an edge or a street sign. In doing so, the user may be asked to identify two adjacent LIDAR points on either side of the edge, a LIDAR point on the edge, or LIDAR points that are within the object (e.g., within the street sign). The user may also provide an aspect of the object, such as drawing a line along the edge or drawing a polygon or circle associated with the object. A constraint may be generated based on the user inputs. Using the constraint, LIDAR points being off from the corresponding place in the image may be treated as a cost, and a cost reduction process may be implemented across multiple constraints to improve the calibration of the camera and LIDAR sensors. Such a process of user input, constraint generation, and/or testing may be repeated until a desired level of performance is achieved.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
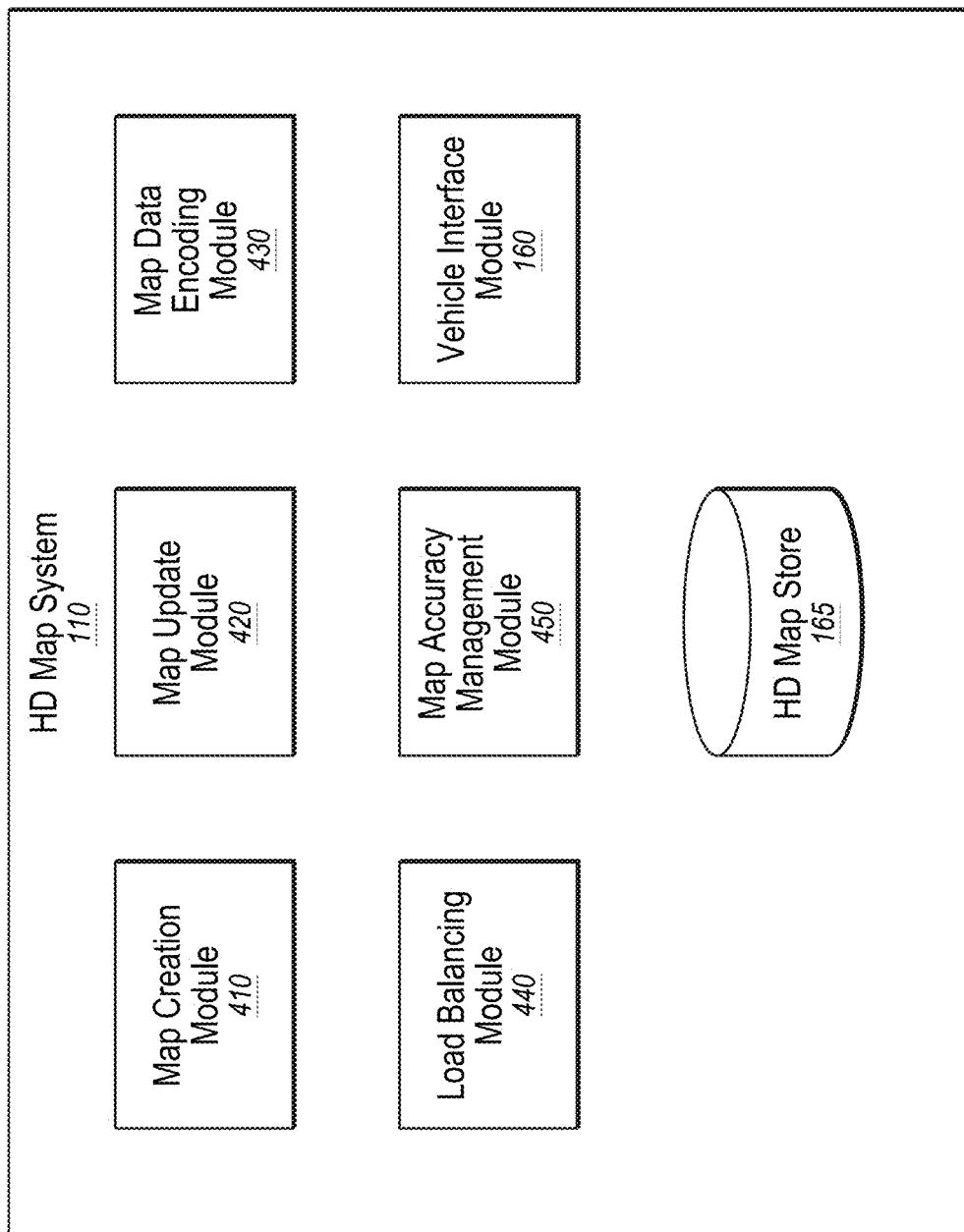
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data that may be captured while driving along various routes and to send it to the online HD map system 110. The online HD map system 110 may be configured to use the sensor data received from the vehicles 150 to create and update HD maps describing the regions in which the vehicles 150 may be driving. The online HD map system 110 may be configured to build high definition maps based on the collective sensor data that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120*a-d*). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
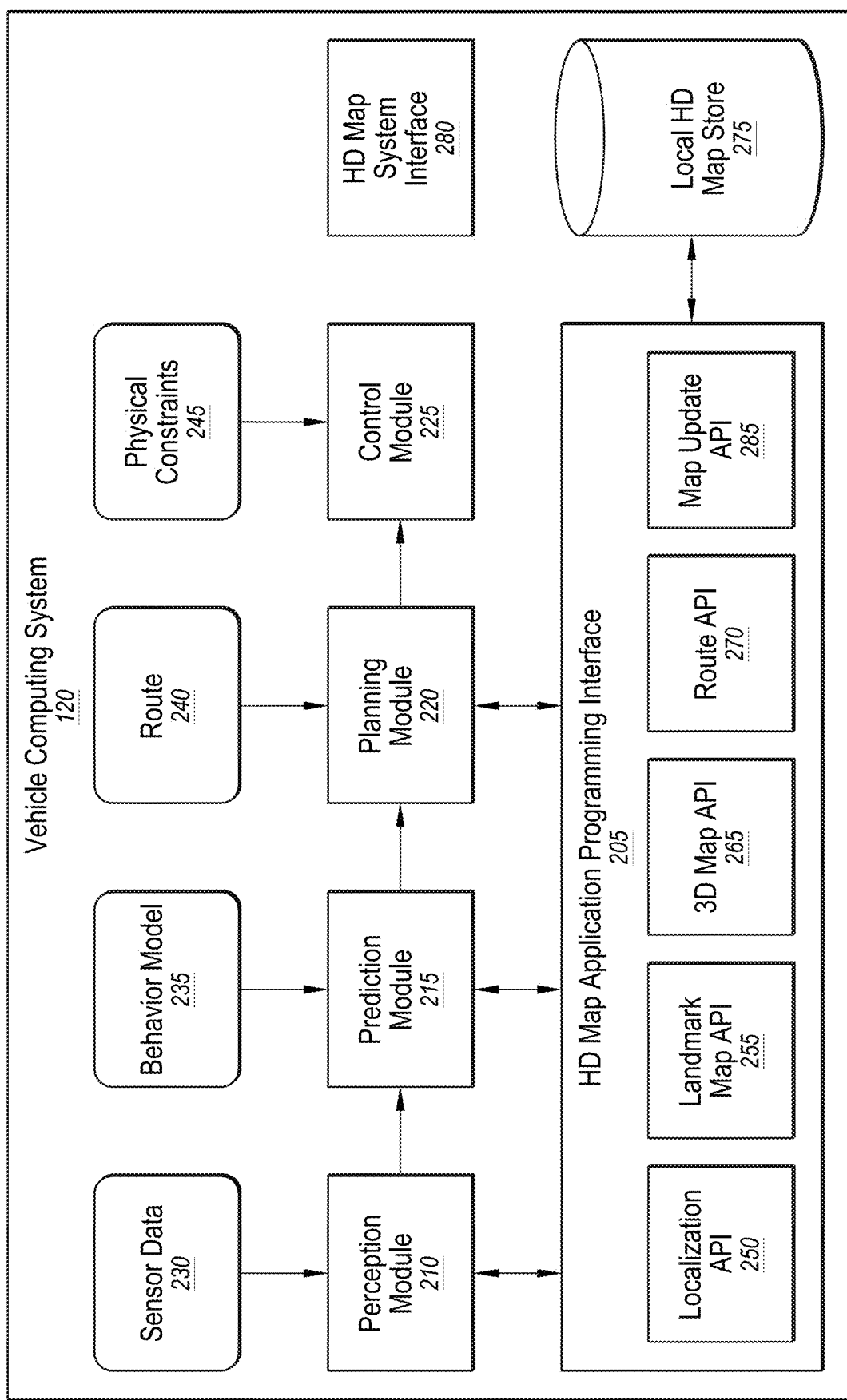
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location.

The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
FIG. 3 illustrates an example of various layers of instructions in an HD map application programming interface (API) of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
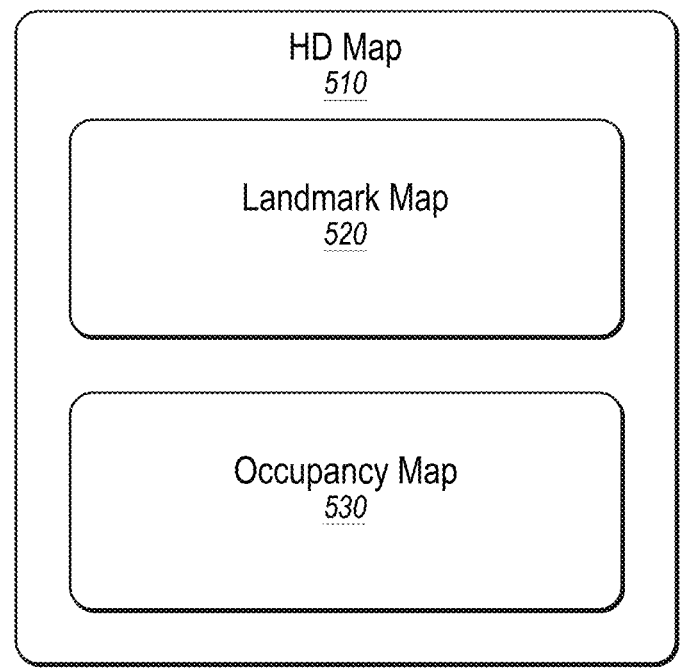
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
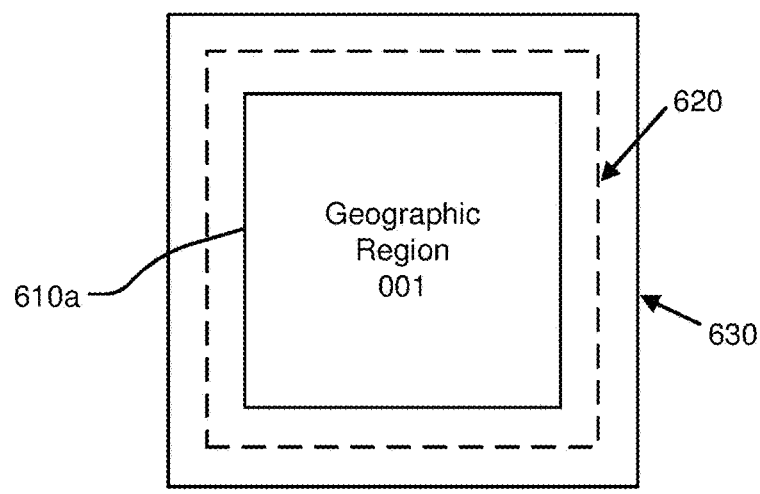
FIGS. 6A-6B illustrate example geographical regions defined in an HD map.
Figure 6B:
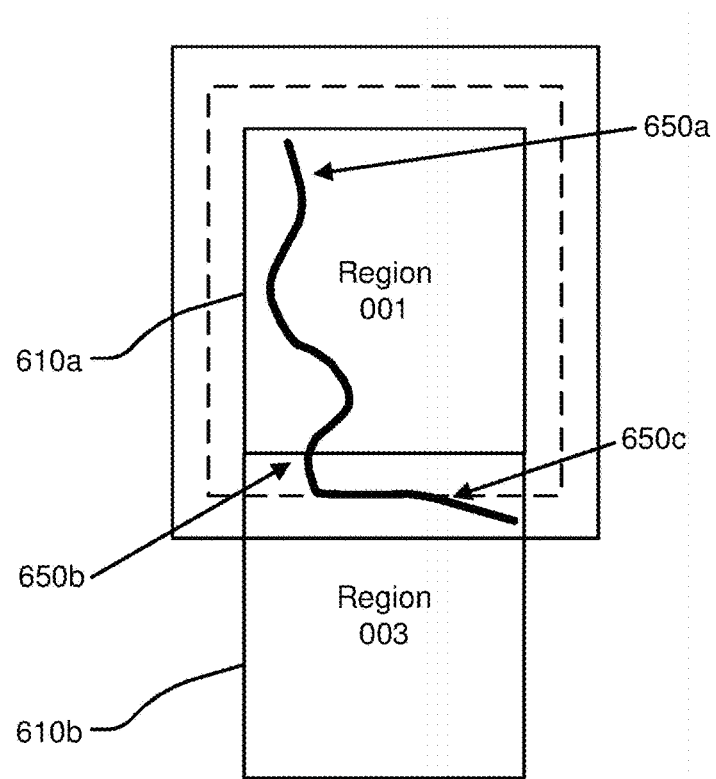

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
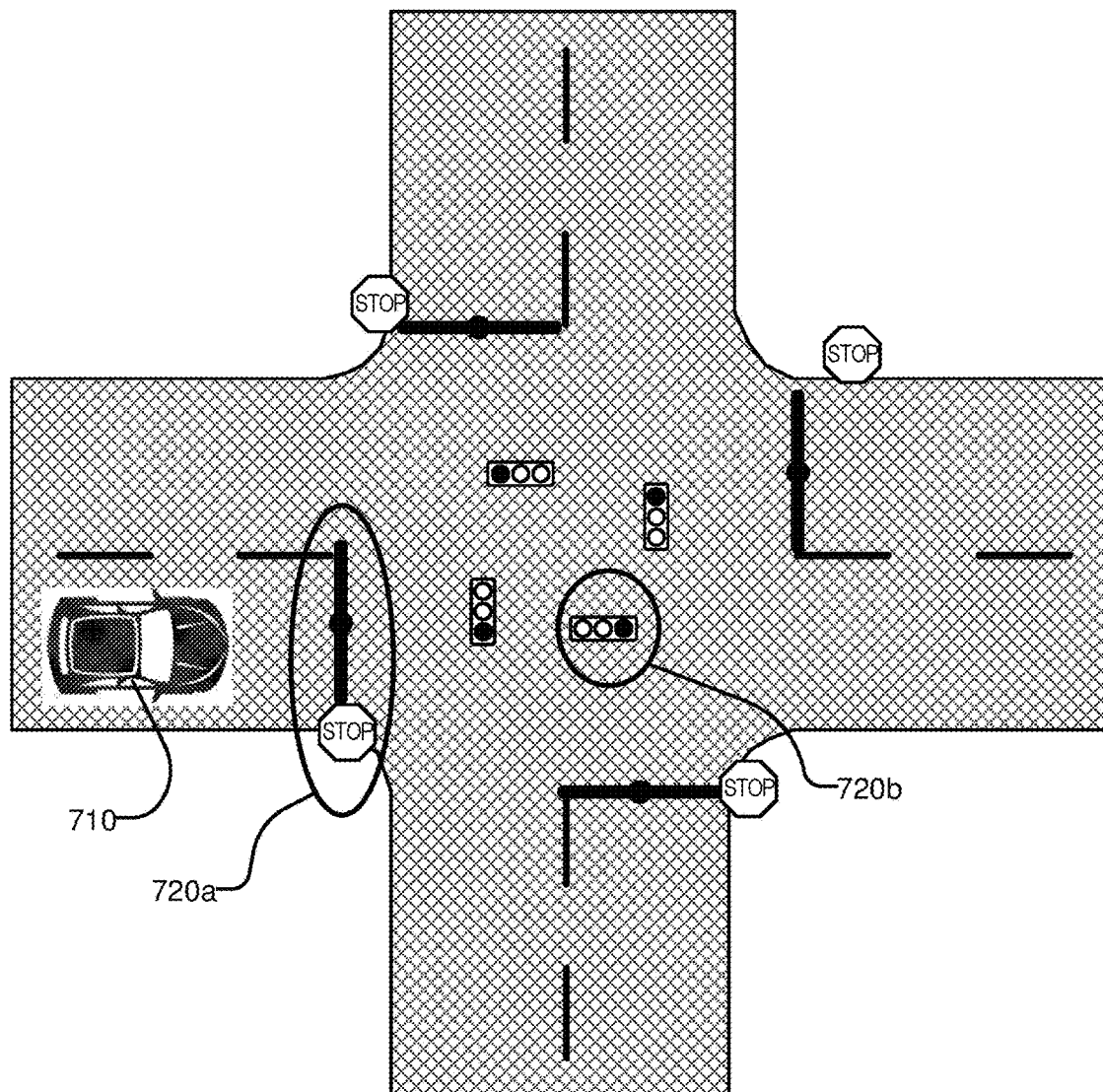
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc. as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
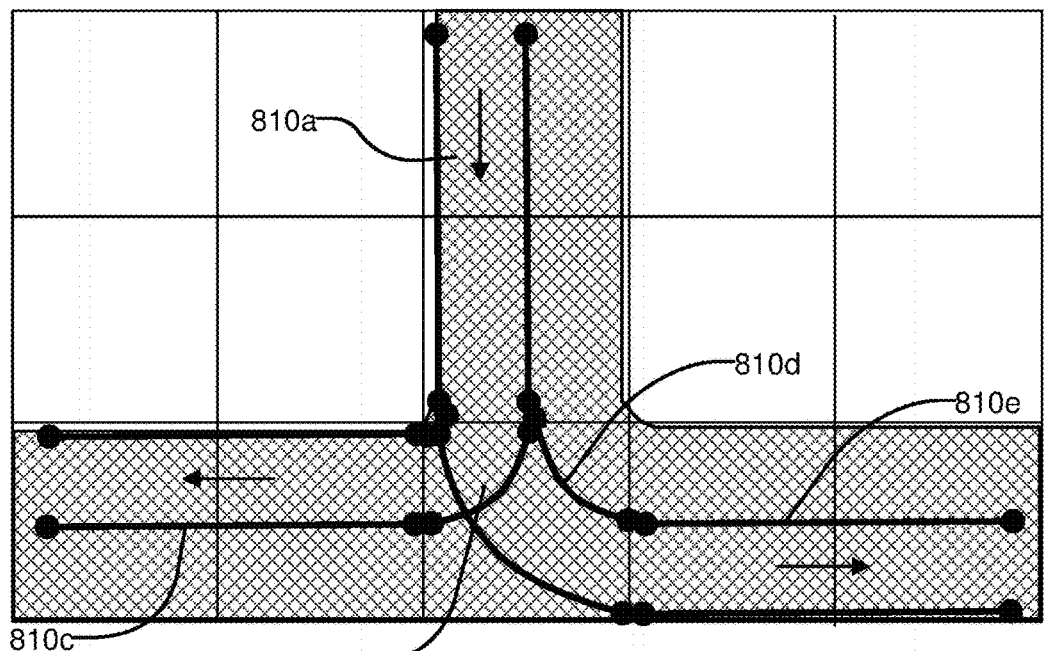
FIGS. 8A-8B illustrate example lane elements and relationships between lane elements in an HD map.
Figure 8B:
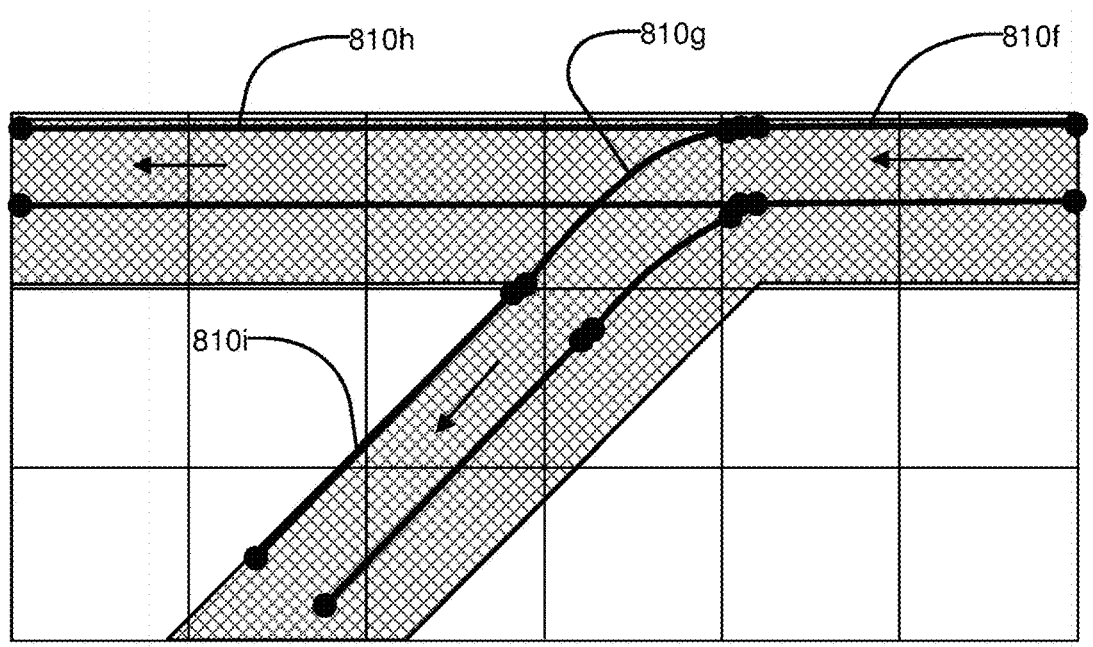

FIGS. 8A-B illustrate lane elements and relations between lane elements in an HD map. FIG. 8A illustrates an example of a T-junction in a road illustrating a lane element 810a that may be connected to lane element 810c via a turn lane 810b and is connected to lane 810e via a turn lane 810d. FIG. 8B illustrates an example of a Y-junction in a road illustrating label 810f connected to lane 810h directly and connected to lane 810i via lane 810g. The HD map system 100 may determine a route from a source location to a destination location as a sequence of connected lane elements that can be traversed to reach from the source location to the destination location.

Lidar-to-Camera Calibration

Additional details regarding lane lines may be found in US 2019/0120947 A1, published Apr. 25, 2019, which is incorporated by reference in the present disclosure in its entirety for all that it discloses. In some embodiments, other calibration efforts or techniques may have failed or be unavailable, and one or more of the interactive calibration techniques described herein may be undertaken.

Figure 9:
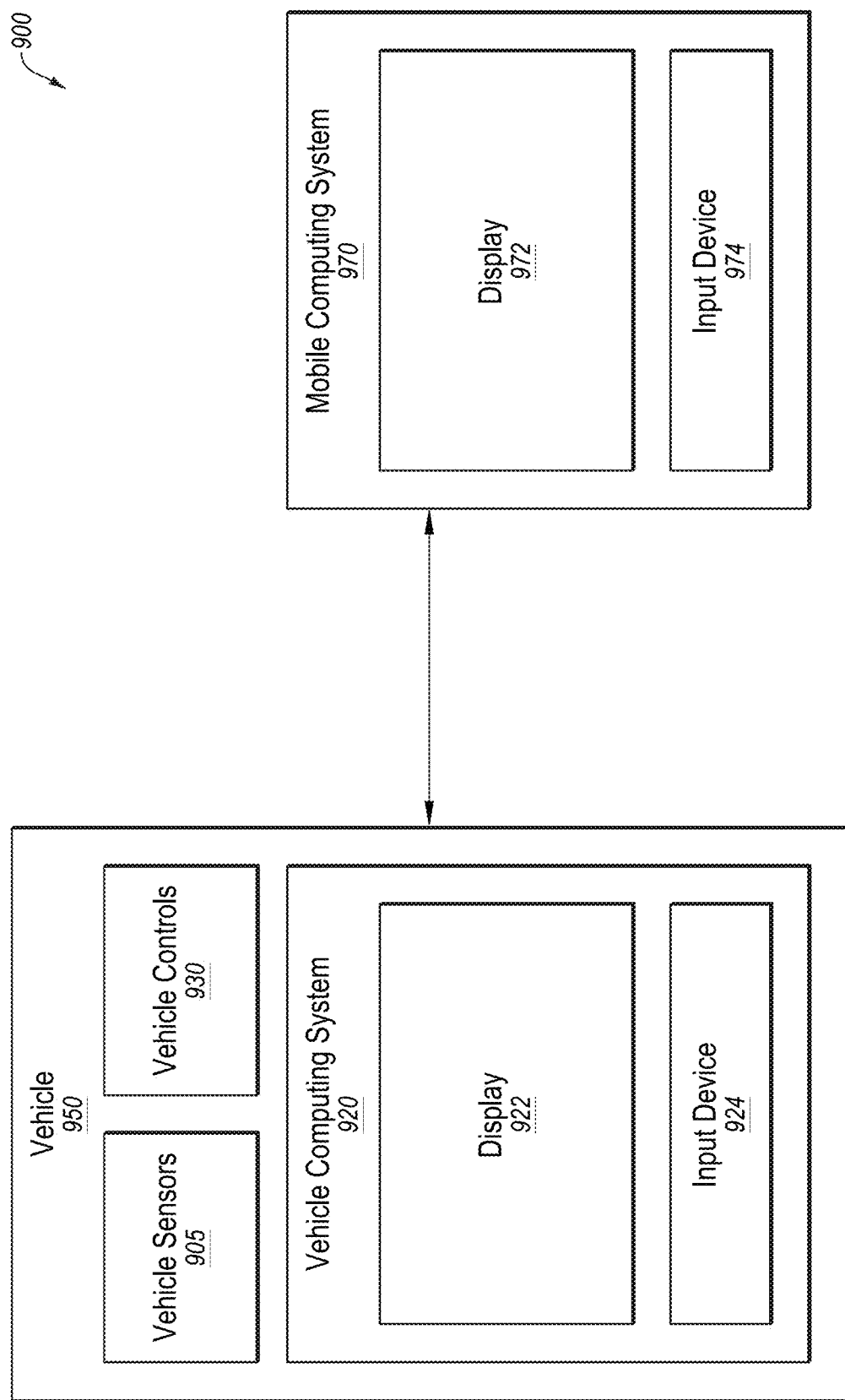
FIG. 9 illustrates an example system including a vehicle and mobile computing device to facilitate interactive sensor calibration for autonomous vehicles.

FIG. 9 illustrates an example system 900 including a vehicle 950 and mobile computing device 970 to facilitate interactive sensor calibration for autonomous vehicles, in accordance with one or more embodiments of the present disclosure. The vehicle 950 may utilize the vehicle sensors 905 to obtain data via which the vehicle computing system 920 may correlate at least a LIDAR sensor and a camera sensor of the vehicle sensors 905. In some embodiments, a user may provide input via an input device 924 of the vehicle computing system 922 and/or an input device 974 of the mobile computing system 970. In some embodiments, a user may hold a patterned sign or image and may receive feedback via the mobile computing system 970 regarding how the patterned sign or image is to be positioned to facilitate calibration of the vehicle sensors 905.

The vehicle sensors 905 may include any sensors, such as the vehicle sensors 105 of FIG. 1, and may include at least a camera and a LIDAR sensor. The vehicle computing system 920 may obtain LIDAR points from the LIDAR sensor and may obtain images from the camera. The LIDAR points may be projected onto and overlaid on the camera image and presented on the display 922.

Figure 10A:
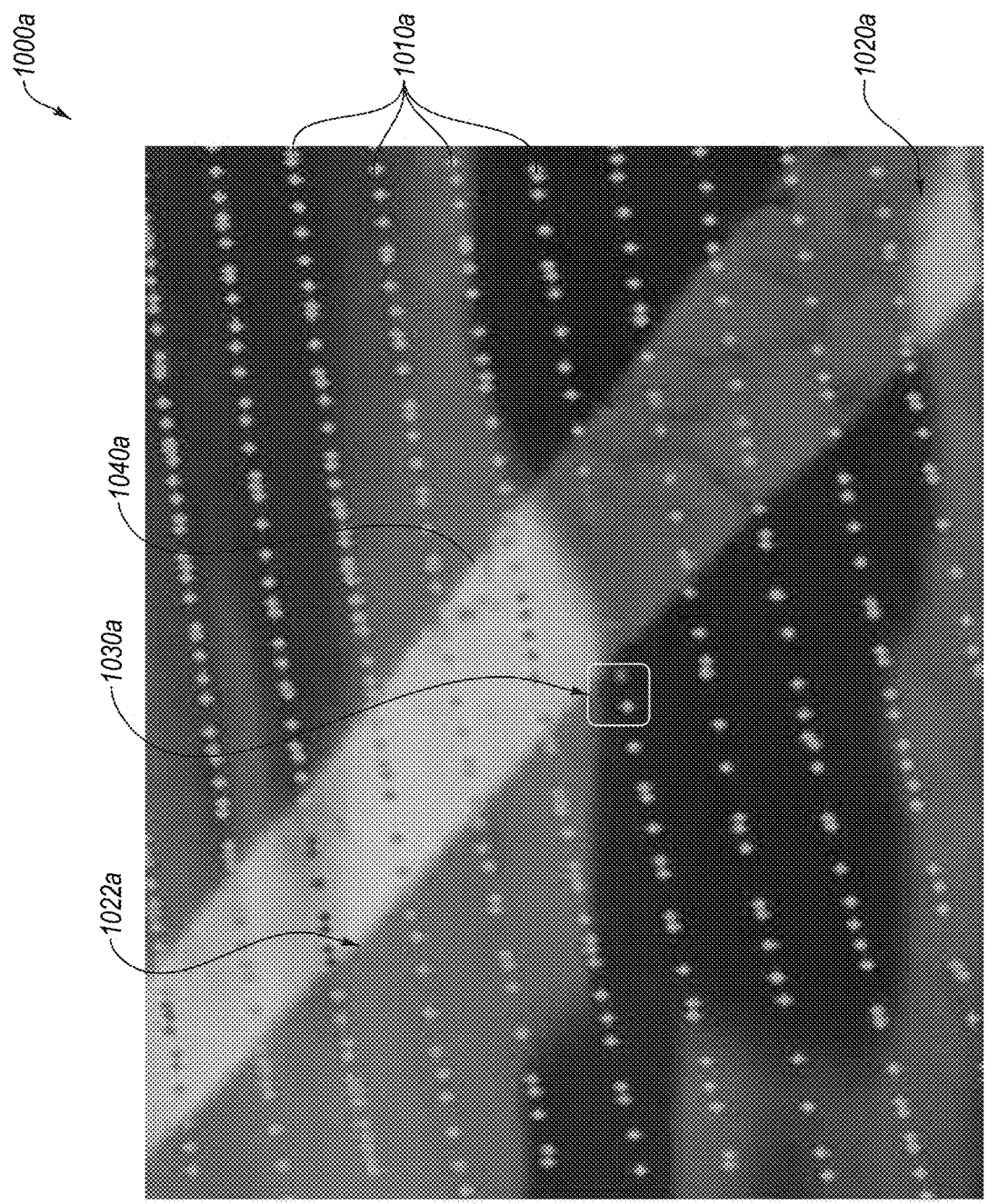
FIGS. 10A-10D illustrate various example user interfaces used to facilitate interactive sensor calibration for autonomous vehicles.
Figure 10B:
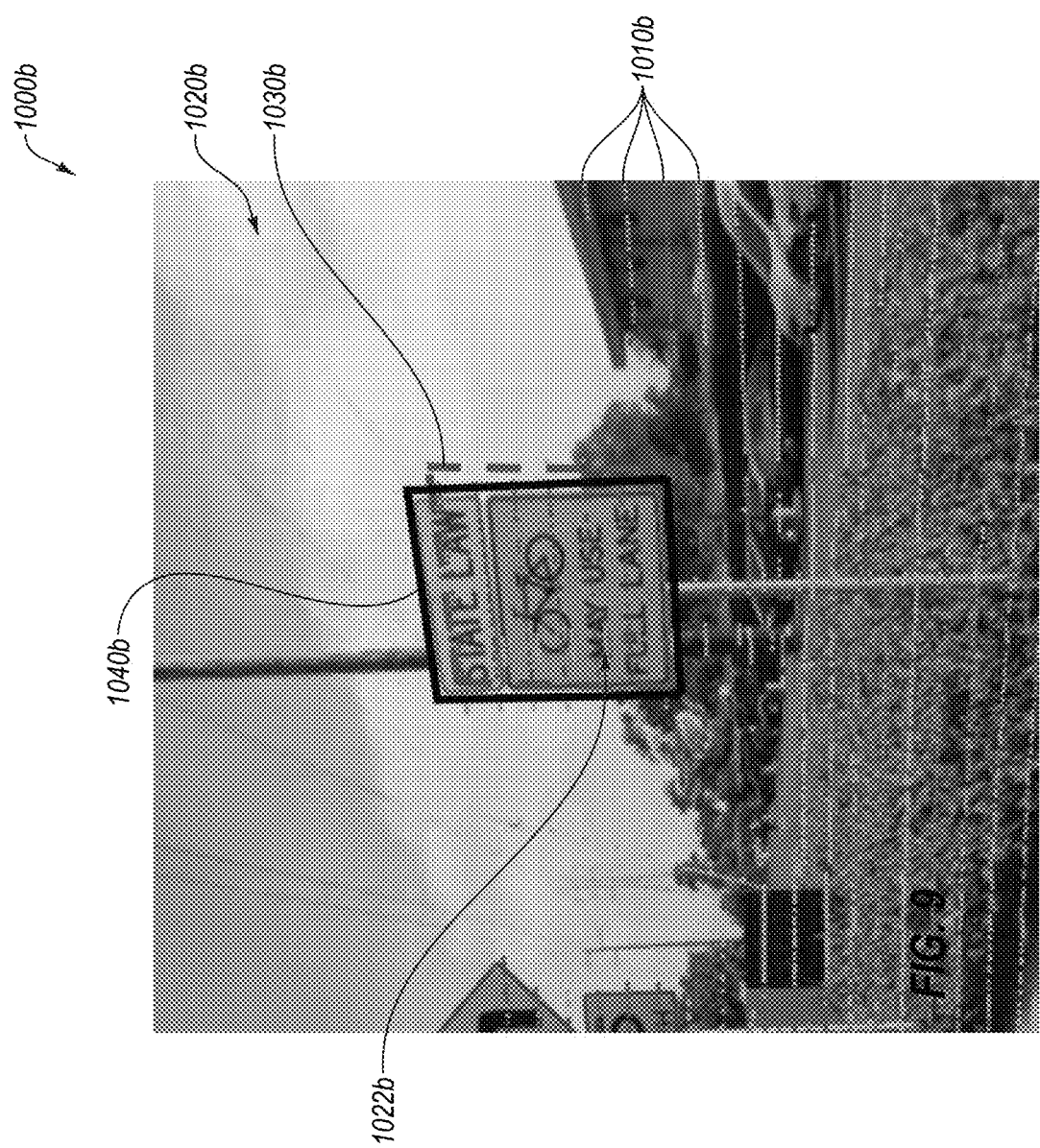
Figure 10C:
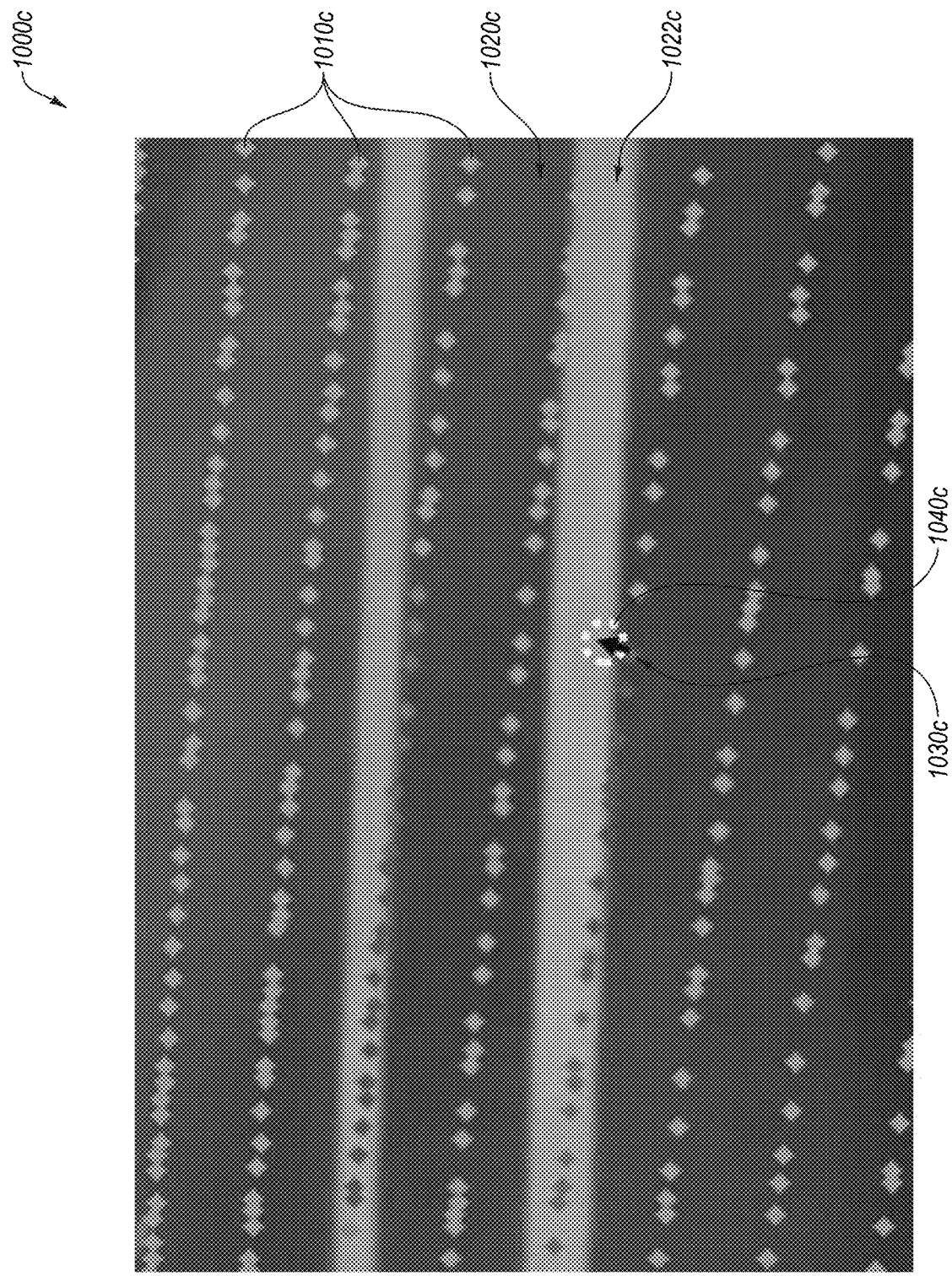

In some embodiments, the user may be asked to identify certain correlations between the LIDAR points and the camera image by identifying various aspects of edges associated with the LIDAR points and camera edges. For example, the user may be asked to identify two LIDAR points on either side of an edge, and then draw or otherwise identify the edge in the camera image. An example of such an approach is illustrated in FIG. 10A. As another example, the user may be asked to identify a region with edges (such as an object like a sign post, a telephone pole, a street sign, a lane mark, etc.). In such an example, the user may be asked to identify which LIDAR points fall within the boundary of the object, and draw a polygon/circle or otherwise identify the location of the object in the camera image. An example of such an approach is illustrated in FIG. 10B. As an additional example, the user may be asked to identify a LIDAR point on an edge, and identify where in the camera image the LIDAR point should be along the edge. An example of such an approach is illustrated in FIG. 10C. As used herein, an edge may be the boundary between two different regions in a camera image and/or LIDAR projections, such as a high intensity region and a low intensity region, a street sign region and a sky region, a lane marker region and a road region, etc. An edge may be an edge based on intensity (e.g., light vs. dark), a physical boundary (e.g., a telephone pole may have a boundary with its surroundings), etc.

Figure 10D:
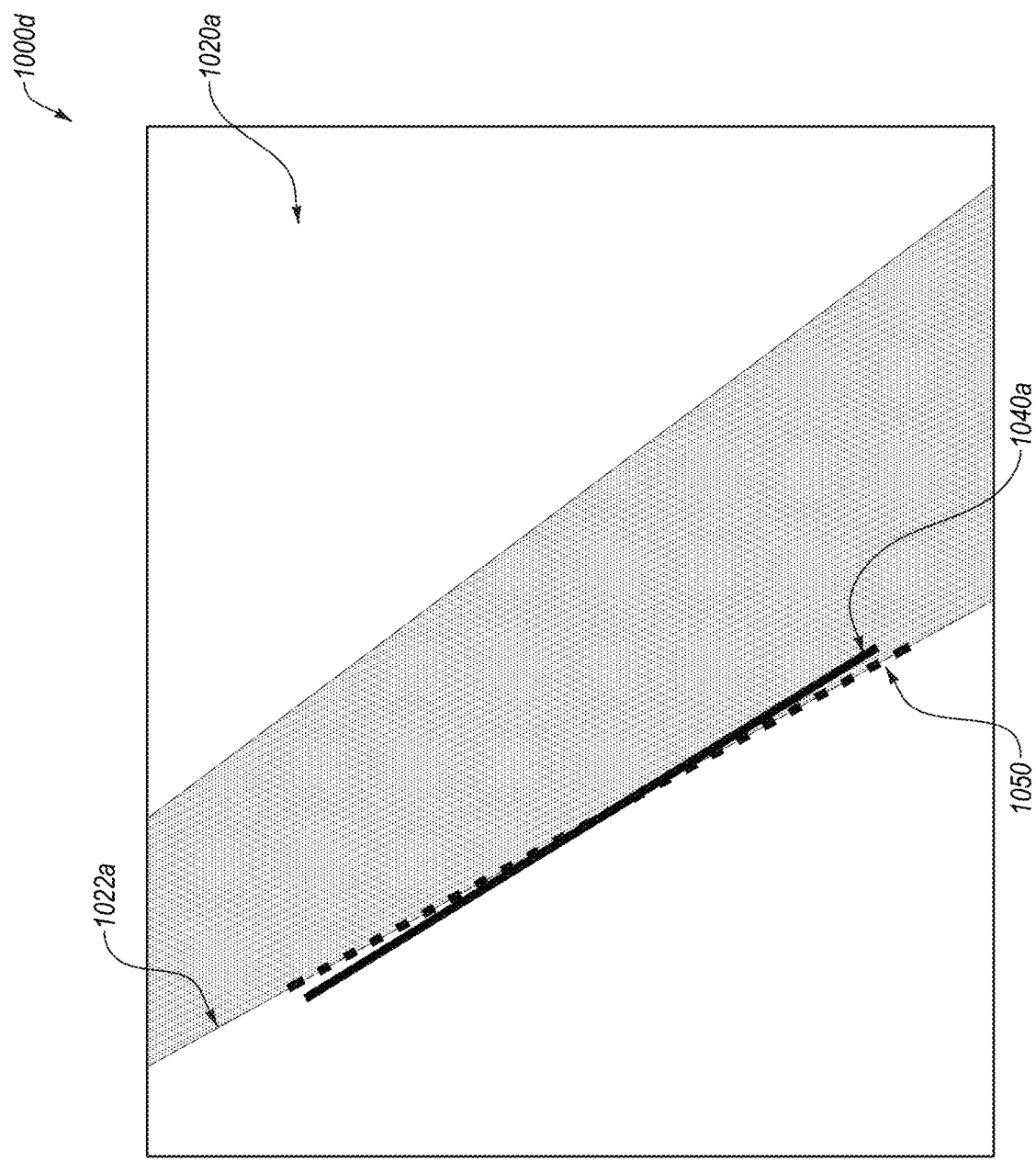

In some embodiments, when making a selection, the vehicle computing system 920 and/or the mobile computing system 970 may provide enhancement to the user selection. For example, manual selection by a user may be multiple pixels off at the endpoints of a line drawn along an edge. Furthermore, it may be very difficult for a user to select an edge with accuracy down to the pixel or sub-pixel. To facilitate such a process, an edge detector algorithm may be applied to the selection made by the user, localized proximate the selection made by the user. For example, a Canny edge detector (or any other edge detection algorithm or approach) may be applied to a localized region within a threshold number of pixels of the user selection. In some embodiments, the edge detection may be a local maximum/minimum identifying process that is applied locally proximate the user selection. By providing such enhancements, the user-selected line or shape may be improved. An example of such an approach is illustrated in FIG. 10D.

In some embodiments, a user interface may be provided with guidance or other supplements to help the user in making the requested selections and/or identifications. For example, the user interface may be divided into a grid of regions within which constraints may be useful. As another example, the user may be provided with real-time feedback regarding the number of constraints currently collected, a target number, etc., which may be broken down by region (e.g., region A has two of four constraints and region B has four of four constraints) or for the entire view. As a further example, the LIDAR points may be depicted in different colors to split them into different three-dimensional regions. For example, for a given region where additional constraints are desired, the LIDAR points may be in a first color and for another region where sufficient constraints have been collected, the LIDAR points may be in a second color. As an additional example, the LIDAR points may be in a first color on one side of an edge, and on an additional color on the other side of the edge.

After collecting the constraints, the vehicle computing system 920 and/or the mobile computing system 970 may utilize a solver to optimize the transform representative of the calibration between the LIDAR and camera sensors. As used herein, the term "optimize" or "optimization" may refer to any attempt or effort to improve a process, mathematical relationship between variables, etc. and is not limited to an actual improvement, or finding a maximal or minimal solution when performing such an "optimization."

In some embodiments, a point to plane optimization may be used. For example, a line feature in the image may be utilized, in conjunction with a plane projected from the center of the camera sensor and through the line in the image. The LIDAR points in 3D space may be compared to the plane projection to improve the calibration between the LIDAR and the camera sensors. For example, the distance between the LIDAR points selected by the user and the virtual planes may be minimized across multiple constraints to optimize the calibration.

Figure 11A:
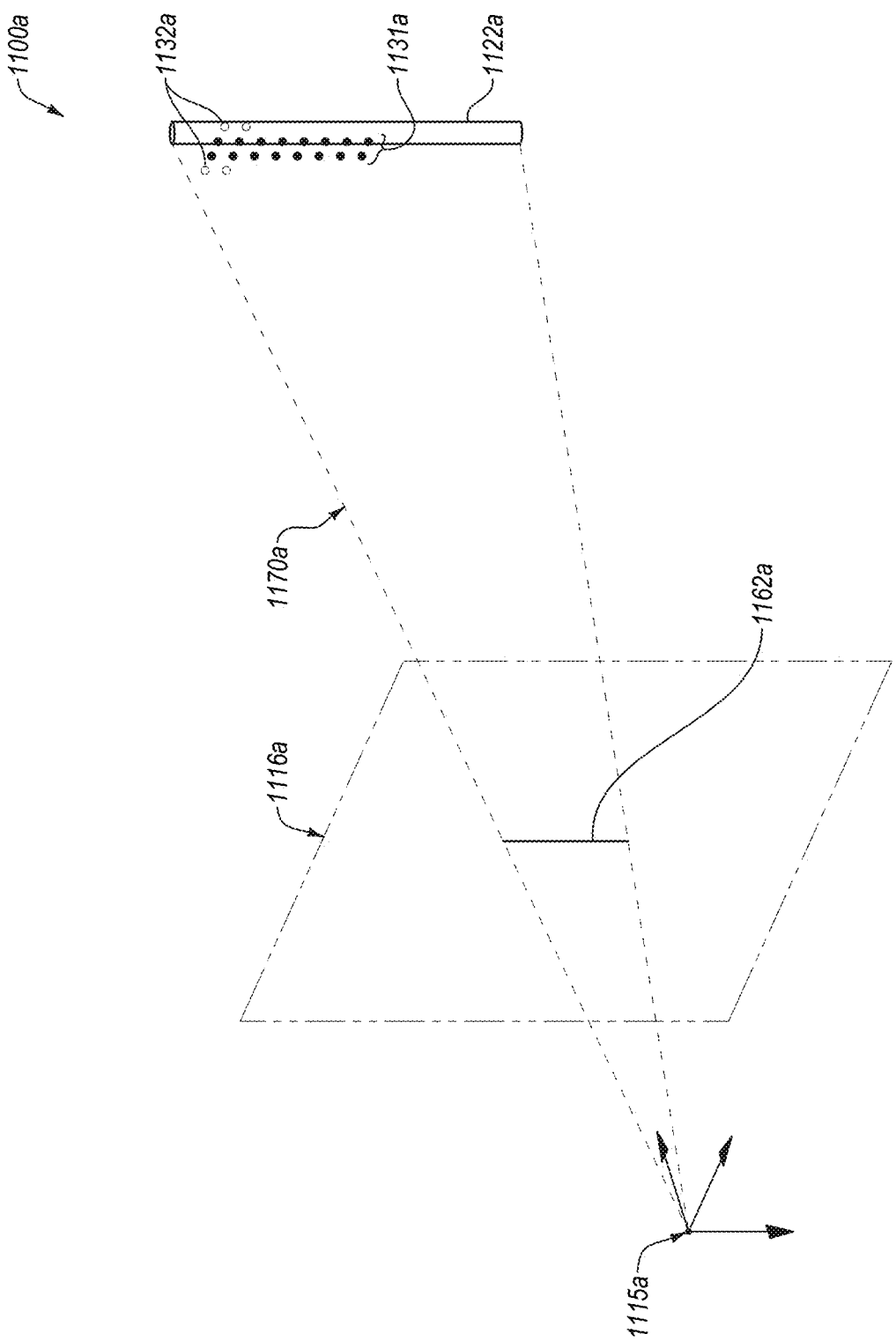

One example of such point to plane optimization includes vertical edges, such as telephone poles, sign posts, etc. Vertical edges in the image may expand into vertical planes in 3D. By minimizing point-to-plane distances between LIDAR points selected by a user as being associated with the telephone pole (e.g., a pair of LIDAR points on either side of the edge, a set of LIDAR points falling within the object, one or more LIDAR points along the edge) and the projected vertical plane, the roll and yaw in camera-to-lidar rotation may be constrained and the associated calibration thereof improved. Using a vertical edge in the image may or may not improve the pitch of the image. An example of projection of a vertical plane is illustrated in FIG. 11A.

Another example of point to plane optimization includes non-vertical edges, such as lane marks. In a similar manner to that used for the vertical edges, using the edge and the center of the camera, a plane may be projected into the 3D space. However, for objects like lane markers which are on the ground, the plane is typically a generally horizontal plane. By minimizing point-to-plane distances between LIDAR points selected by a user as being associated with the lane marker (e.g., a pair of LIDAR points on either side of the edge, a set of LIDAR points falling within the object, one or more LIDAR points along the edge) and the projected generally horizontal plane, the roll, yaw, and pitch angles in camera-to-lidar rotation may be constrained and the associated calibration thereof improved. An example of projection of a generally horizontal plane is illustrated in FIG. 11B.

To mathematically solve the point to plane minimization, a computer-assisted solver may be used (e.g., a Ceres Solver) as a non-linear optimization. Additionally or alternatively, an assumption may be made that the change in the transform is a small change and minimize the distances as a linear least square problem.

An example of the computer-readable instructions provided to a Ceres Solver are provided below, although any computer-readable instructions may be included, and any computer-assisted solver may be used in conjunction with the present disclosure.

```
class PointToPlaneCost {
    public:
        PointToPlaneCost(const Eigen::Vector3f& source_point,
                    const Eigen::Vector3f& target_point,
                    const Eigen::Vector3f target_normal) :
                source_point_(source_point),
                target_point_(target_point),
                target_normal_(target_normal) { }
    bool operator( )(const T trans[3], const T rot[4], T residual[1])
const {
        Eigen::Map<const Eigen::Matrix<T, 3, 1>> translation(trans);
        Eigen::Map<const Eigen::Quaternion<T>> rotation(rot);
        // compute the error
        (*residual) = target_normal_.cast<T>.dot(rotation
                * source_point.cast<T>( )
                + translation - target_point.cast<T>( ));
        return true;
    }
}
```

One example of using the linear least square solving approach is described mathematically as follows. The transform may be represented as $$\delta x = [tx, ty, tz, \alpha, \beta, \gamma]^T$$

where each transform parameter corresponds to a dimension, for example, translations in each cartesian direction (tx, ty, tz), and roll, pitch, and yaw ($\alpha$, $\beta$, $\gamma$). With the small angle assumption described herein, the rotation matrix R may be approximated as $$R = [1 - \alpha \beta \alpha 1 - \gamma - \beta \gamma 1]$$

When solving, a cost function may be described using a source point $p_1$, a target point $p_0$, and a target normal as n as:

$$= \|n^T \cdot (R \cdot p_1 + T - p_0)\|^2$$

$$= \|n^T \cdot [1 - \alpha \beta \alpha 1 - \gamma - \beta \gamma 1] \cdot [p_{1x} p_{1y} p_{1z}] + [t_x, t_y, t_z] - [p_{0x} p_{0y} p_{0z}]\|^2$$

$$= \|n^T \cdot [100010001 - p_{1y} p_{1z} 000 - p_{1z} 0 p_{1x} p_{1y}] \cdot [t_x t_y t_z \alpha \beta \gamma] - [p_{0x} - p_{1x} p_{0y} - p_{1y} p_{0z} - p_{1z}]\|^2$$

The variables A and b may be used to represent certain portions of the above equation as follows $$A = [100010001 - p_{1y} p_{1z} 000 - p_{1z} 0 p_{1x} p_{1y}], b = [p_{0x} - p_{1x} p_{0y} - p_{1y} p_{0z} - p_{1z}]$$

Using A and b, the cost function may be expressed as follows.

$$= \|n^T \cdot (A \cdot \delta x - b)\|^2$$

$$= \|n^T \cdot A \cdot \delta x - n^T \cdot b\|^2 \text{ and } A' = n^T \cdot A, b' = n^T \cdot b$$

$$= \|A' \cdot \delta x - b'\|^2$$

$$\delta x = (A'^T \cdot A')^{-1} \cdot (A'^T \cdot b')$$

Using the above-referenced equation, the linear least square may be solved.

In some embodiments, a 3D point to 2D image boundary solving approach may be utilized. For example, such a solving approach may be used when polygonal or circular shaped objects are used. Examples of such objects include octagonal stop signs, circular or rectangular speed limit signs, etc. In these and other embodiments, the solving approach may include the user selecting the LIDAR points that belong within the object (even if some of the points do not appear to be so when overlaid on the camera image), and drawing the shape of the object in the camera image. The selected LIDAR points may be assigned zero cost if within the boundary of the object drawn by the user, and may incur a cost that is a square of the distance from the polygon if the points are outside of the polygon. For polygons, the cost may be based on the square of the distance to the polygon and for circles, the cost may be based on a square of the value of the distance to the center of the circle minus the radius.

In some embodiments, to solve the squared distance optimization, a computer-based solver may be utilized, such as a Ceres Solver. An example of the computer-readable instructions provided to a Ceres Solver for using a polygon are provided below, although any computer-readable instructions may be included and any computer-assisted solver may be used in conjunction with the present disclosure. For circles, a variation may include how the distance that is squared is determined.

```
class PointToPolygonCost {
  Public:
      PointToPolygonCost(const Eigen::Vector3f& source_point,
                const Image2DPolygon& polygon,
                const Eigen::Matrix<float, 3, 4>& projection_matrix)
      : source_point_(source_point),
        polygon_(polygon),
        projection_matrix_(projection_matrix) { }
      bool operator( )(const T trans[3], const T rot[4], T residual[1])
      {
        Eigen::Map<Eigen::Vector<T, 3, 1>> translation(trans);
        Eigen::Map<Eigen::Quaternion<T>> rotation(rot);
        Eigen::Matrix<T, 3, 1> homogeneous_projection =
            projection_matrix.cast<T>( ) *
(rotation * source_point_.cast<T>( ) + translation).homogeneous( );
        T image_projection_x = homogeneous_projection[0] /
            homogeneous_projection[2];
        T image_projection_y = homogeneous_projection[1] /
            homogeneous_projection[2];
        if(polygon.Contain(image_projection_x, image_projection_y)) {
          *residual = T(0);
        } else {
          *residual = polygon.Distance(image_projection_x,
            image_projection_y);
        }
      }
    private:
      Eigen::Vector3f& source_point_;
      Image2DPolygon polygon_;
      Eigen::Matrix<float, 3, 4> projection_matrix_;
}
```

In some embodiments, the optimization process described may be performed a single time (e.g., a user is prompted and selects a sufficient number of constraints for calibration, the optimization is performed/solved, and the updated transform is utilized). Additionally or alternatively, the optimization process may be performed iteratively. For example, an initial set of constraints may be collected from a user and the transform may be optimized. The performance may be checked against some threshold performance metric for the calibration, such as a sum of the distances from LIDAR points and edges, a maximum distance for a LIDAR point from edges, etc. Based on the performance of the LIDAR, the user may be prompted to gather and facilitate the generation of an additional set of constraints to further calibration of the LIDAR and camera sensors. Such iterative calibration and testing may be repeated until a desired level of performance is achieved (e.g., the threshold is exceeded). After the calibration an autonomous vehicle may be operated using the calibrated LIDAR and camera sensors, for example, using the vehicle controls 930.

In some embodiments, other calibrations approaches may be utilized. For example, a user may utilize a hand-held checkerboard or other visual aid in calibration of the LIDAR and/or camera sensors. However, without feedback the user may end up providing too much data in some areas and not enough in others, which may drag the calibration off from ground truth because of the disproportionate distribution of data. The user may utilize the mobile computing system 970 when holding and/or moving the checkerboard to receive instructions. For example, the mobile computing system 970 may connect with the vehicle computing system 920 via a hotspot or other wireless communication technology. The vehicle computing system 920 may obtain certain data for calibration using the camera and/or LIDAR sensors and may provide communication to the mobile computing system 970 regarding the obtained data, and other data to be obtained.

In some embodiments, the vehicle computing system 920 may provide instructions to the mobile computing system 970 to be displayed on the display 972 that the checkerboard is to be moved to a different location in space (e.g., translation) or is to be angled or tilted in a different direction (e.g., the pitch, roll, or yaw is to be adjusted). In these and other embodiments, visual cues may be provided, such as those illustrated in FIGS. 12A and 12B. Such calibration techniques using the checkerboard and feedback may be used to provide intrinsic camera calibration, extrinsic calibration, stereo camera calibration, etc. For LIDAR to camera calibration, such calibration may occur as the autonomous vehicle 950 is driven. In some embodiments, the user may interact with the mobile computing system 970 to indicate which calibration process to perform, such as intrinsic camera calibration, extrinsic calibration, stereo camera calibration, LIDAR to camera calibration, etc.

For intrinsic and/or extrinsic camera calibration, a detection algorithm may detect a portion of a checkerboard. When doing so, the system may capture more images near the corners of the images. The system may also utilize improvements to camera exposure, centering a camera optical center, or other image gathering improvements. Examples of such guidance and capture may be illustrated and described in FIGS. 12A and 12B.

When performing the camera to LIDAR calibration, an assumption may be made that the camera and/or LIDAR body frames may be moved (e.g., the vehicle 950 may be moving). To perform the calibration, a calibration board may be placed at a fixed location within view of the LIDAR and camera sensors. The vehicle 950 may be moved with the LIDAR and camera sensors rigidly mounted to the vehicle 950 in view of the calibration board. For any two frames, the image coordinates of the same corner of the calibration board in the corresponding two images may provide one 2D point to 2D point correspondence. The system may use an iterative closest point (ICP) process to compute the relative LIDAR transform between the two LIDAR positions. Each correspondence (e.g., each of the 2D point to 2D point correspondences, and each of the LIDAR transforms) may be used as a coplanarity constraint that may be used in solving for the overall transform. For example, each of the coplanarity constraints may be used to minimize the square sum of all of the coplanarity constraints. Such an approach may utilize a computer assisted solver (e.g., a Ceres Solver) or any other solving approach.

In some embodiments, the coplanarity constraints may be described mathematically. For example, given a camera/LIDAR at position $x_0$ at time $t_0$ and at position $x_1$ at time $t_1$, the transform $\Delta T_c$ of the camera between the two time points may be represented by $$\Delta T_c = T_{CL}^{-1} \cdot \Delta T_L \cdot T_{CL} = [\Delta R_c, \Delta t_c]$$

where $\Delta R_c$ may represent the rotation of the camera, $\Delta t_c$ may represent the change in the three dimensional coordinates (the translation) of the camera, $T_{CL}$ may represent the transform from camera to LIDAR, $\Delta T_L$ may represent the transforms between the LIDAR positions. Additionally, the camera projection matrix ($M_{proj}$) may be presented by:

$$M_{proj} = [K_{3\times 3} | 0]_{3\times 4}$$

The coplanarity constraint may be represented by $$x_0^T K^{-T} S_b \Delta R^{-1} K^{-1} x_1 = 0$$

which may also be reduced to $$x_0^T F x_1 = 0$$

where F is the fundamental matrix between the two camera positions and where $S_b$ represents a skew matrix derived from the translation part of the relative transform between the two cameras expressed above, where $$S_b = [0 - \Delta t_{C3} \Delta t_{C2} \Delta t_{C3} 0 - \Delta t_{C1} - \Delta t_{C2} \Delta t_{C1} 0]$$

In some embodiments, after the calibration board may be placed at a fixed location within view of the LIDAR and camera sensors, the vehicle 950 may be driven towards the calibration board while capturing forty five frames. Using the frames, the LIDAR to camera sensor calibration may be performed. Such solving may take five minutes or less.

FIGS. 10A-10D illustrate various example user interfaces 1000a-1000d used to facilitate interactive sensor calibration for autonomous vehicles. As illustrated in the user interfaces 1000, a set of LIDAR points 1010 may be overlaid on a camera image 1020. The camera image may include an edge associated with an object 1022, and the user may provide first input selecting LIDAR points 1030 associated with the edge 1022. The user may additionally provide second input selecting an aspect of the object.

In FIG. 10A, the user may select LIDAR points 1030a on either side of the edge of a street line 1022a, and may draw the line 1040a along the edge.

In FIG. 10B, the object 1022b may be a street sign, and the user may select the LIDAR points 1030b that should lie within the street sign, and may draw the boundary 1040b of the street sign.

In some embodiments, certain LIDAR points within the boundary of the street sign may be affected based on an artefact in the image. For example, ghost points (e.g., LIDAR points that are projecting from the pole behind the sign) may be identified. In these and other embodiments, such ghost points may be removed or otherwise excluded from the identification of belonging to the object 1022b.

In FIG. 10C, the object 1022c may be a street line and the user may select the LIDAR point 1030c that should be at the edge of the street line, and the region 1040c that is along the edge of the street line. In some embodiments, the region 1040c may be a circular region to accommodate user error and to facilitate computer assistance of the region, such that the edge may be determined precisely.

In FIG. 10D, an example of the computer assistance is illustrated. For example, the user may select the line 1040a as the edge of the street line 1022a of the image 1020a of FIG. 10A. The vehicle computing system may perform edge detection near (e.g., within a threshold distance) of the user selected line 1040a to derive a more accurate line 1050.

When picking an edge in the image (e.g., drawing the line 1040a), even with the help of user-interface zoom, endpoints may be one or two pixels off, or more. By having such pixels off about a 0.1 degree rotation error may be introduced, as each pixel may be around 0.05 degree wide in some implementations. However, the whole point of the calibration is an unknown of where precisely the exact edge location is within the LIDAR point cloud. The edge may be anywhere between the two adjacent points. Such uncertainty may introduce up to 0.1 degrees of additional rotation error. Combined, simply drawing may introduce a 0.2 degree rotation error.

In some embodiments, to address the error, a polygon or circle selection may be utilized in the image to contain identify LIDAR points. In such an implementation, the error may be primarily determined by the polygon or circle in the image. By doing so, even with the same one or two pixel error (or more), the rotation error may be about 0.1 degree. Such errors are on a per-constraint basis As the number of constraints increases, the accumulated error may decrease. For example, if a desired rotation error was 0.06 degree (about 1 mrad), the average error of all constraints may be expected to be less than 1 pixel. To illustrate, if the error of each constraint is normally distributed and its standard deviation is σ, the error of sampling constraints should be $$\frac{\sigma}{\sqrt{N}} \leq 0.06$$

Solving for the number of constraints N≥σ², if we choose σ as 0.25, as 5 pixels includes 0.25 degrees error, the solved for number of constraints is 17. In these and other embodiments, any number of constraints may be used as the target number of constraints, and the above simply serves as one example of how the target number of constraints may be determined.

FIGS. 11A-11B illustrate various examples of 2D-3D correlations 1100, for example, those used in a point to plane optimization. For example, FIGS. 11A and 11D illustrate a camera center 1115 (depicted as 1115a in FIGS. 11A and 1115b in FIG. 11B), an edge 1162 in a 2D plane 1116 (depicted as 1116a in FIG. 11A and 11156 in FIG. 11B), and a projected plane 1170 (projected vertically in FIG. 11A and horizontally in FIG. 11B). Certain LIDAR points 1131 are associated with the object 1122 and other LIDAR points 1132 are not. FIGS. 11A and 11B illustrate visually the projection of the line in 2D into 3D space for the point to plane optimization.

Figure 12A:
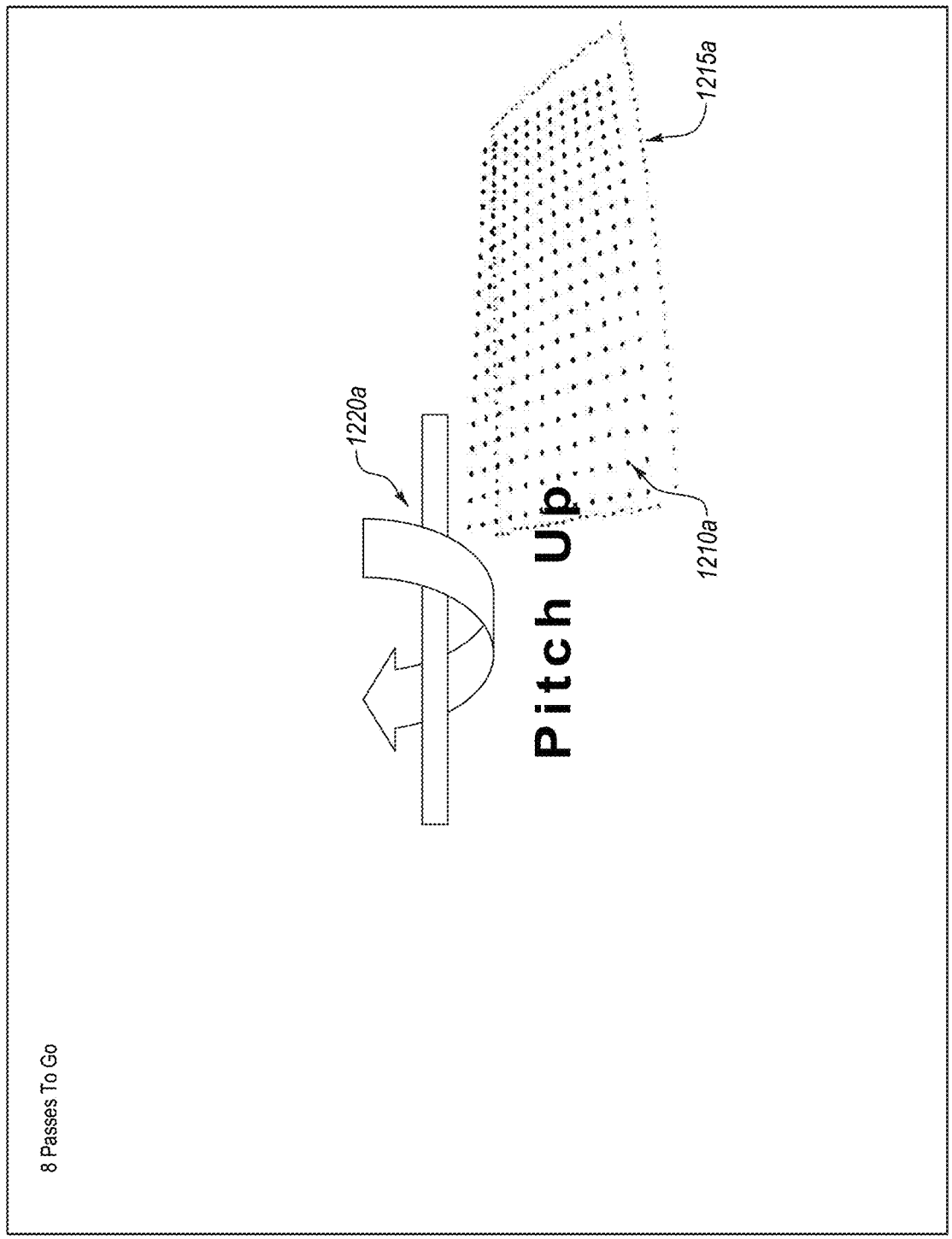
FIGS. 12A-12B illustrate another set of various example user interfaces used to facilitate interactive sensor calibration for autonomous vehicles.
Figure 12B:
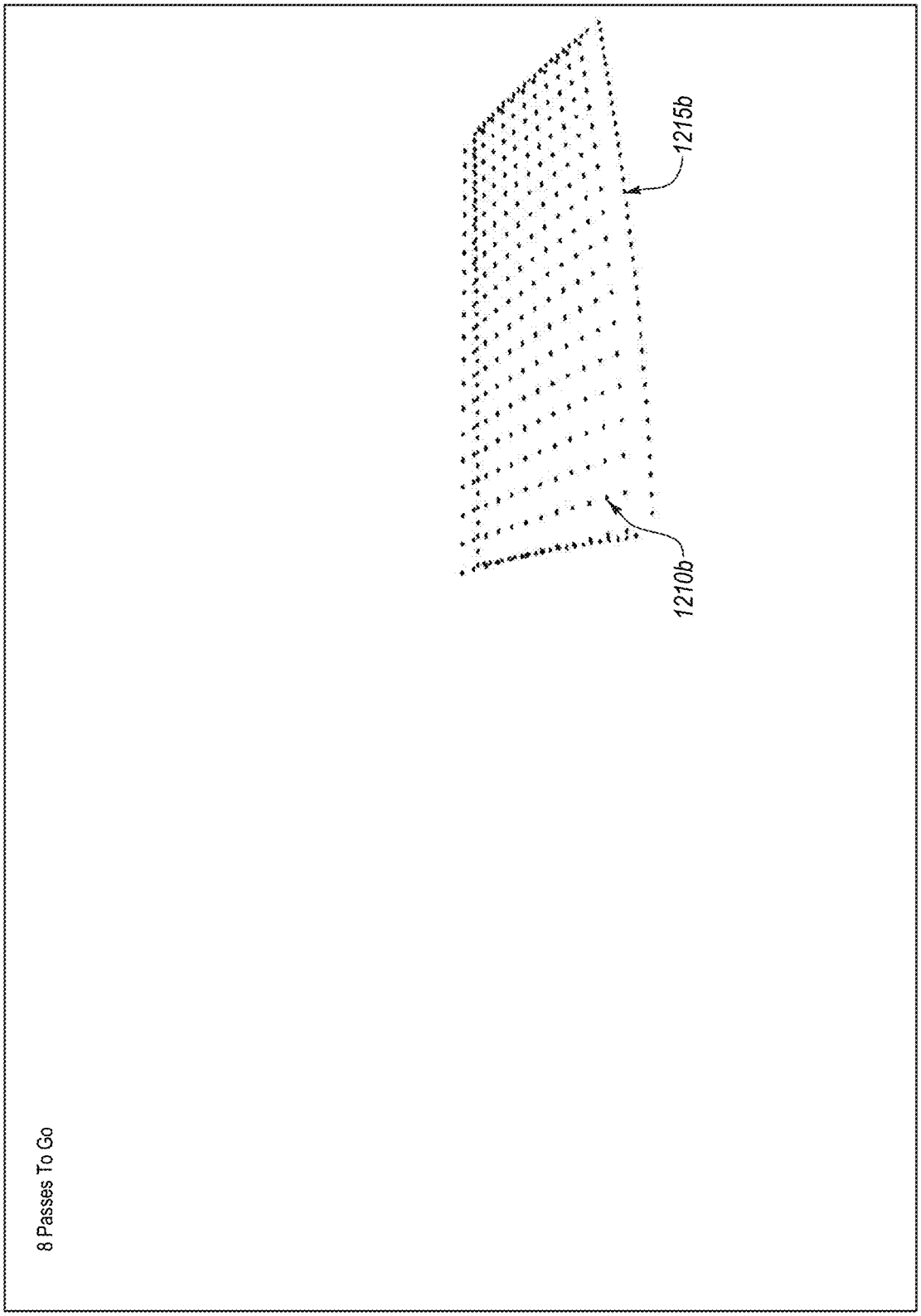

FIGS. 12A-12B illustrate another set of various example user interfaces 1200 used to facilitate interactive sensor calibration for autonomous vehicles. For example, FIG. 12A illustrates a current orientation 1210 of the calibration board, a target orientation 1215a of the calibration board, and/or instructions 1220 to facilitate aligning the current and target orientations.

For example, during the calibration process, the mobile computing system 970 may display a desired pose, which may be represented by the target orientation 1215a. Additionally, the display may show the real time detected checkerboard as the current orientation 1210. A user may move the calibration board to match the desired orientation. Although displayed as an abstraction of a checkerboard in the above image, in some embodiments, the display may include a real-time image or video of the user and checkerboard, as well as the target orientation 1215a. To make things easier, the mobile computing system may provide instruction about how to move the checkerboard to achieve this goal. These instructions may include Move Away, Move Close, Roll Clockwise, Roll CounterClockwise, Pitch Up, Pitch Down, Yaw Left, Yaw Right, etc. In some embodiments, the mobile computing system may display a color-coded signal indicating whether the checkerboard is close to the target orientation 1215a. For example, a signal may be displayed as a traffic light, with red illuminated if the checkerboard is not close to the target orientation 1215a, yellow illuminated if the checkerboard is close to the target orientation 1215a, and green illuminated if the checkerboard is in the target orientation 1215a. The mobile computing system may display a counter counting up the number of valid pictures captured in the orientation.

When the orientation is close enough to the target orientation 1215a, points of the bounding box of the target orientation 1215a may transition from a first color to a second color, such as blue to green. The mobile computing system may set thresholds, such as a translation threshold of 5 cm and/or a rotation threshold of 5 degrees. These two values may be configured to different values. When the bounding box of the target orientation 1215a changes color, a user may be instructed to hold the calibration board (e.g., checkerboard) still, as a stable checkerboard reduces blur in captured images, which may improve detection accuracy.

The mobile computing system may set a number of pixels (such as two) as the threshold to consider if checkerboard is still enough. After a set number of still frames in a row are collected (e.g., six still frames), the current orientation may be considered as finished and the mobile computing system may display a next target orientation, and capture additional images, etc. until all orientations are captured.

In some embodiments, the vehicle computing system may collect sixteen orientations for intrinsic calibration and twelve orientations for stereo calibration. The vehicle computing system may capture orientations on the image evenly and may provide the orientations close to the four corners of the images more than in other regions of the image.

After all orientations are collected, in-car software of the vehicle computing system may start to perform calibration computation. In these and other embodiments, computing time may be less than two minutes for intrinsic calibration, and thirty seconds for stereo calibration. In some embodiments, a reprojection error may be shown on the vehicle computing system display or the mobile computing system display to help indicate a quality of the current calibration. A user may then decide whether to deploy these calibration parameters to the vehicle computing system for operation.

Figure 13A:
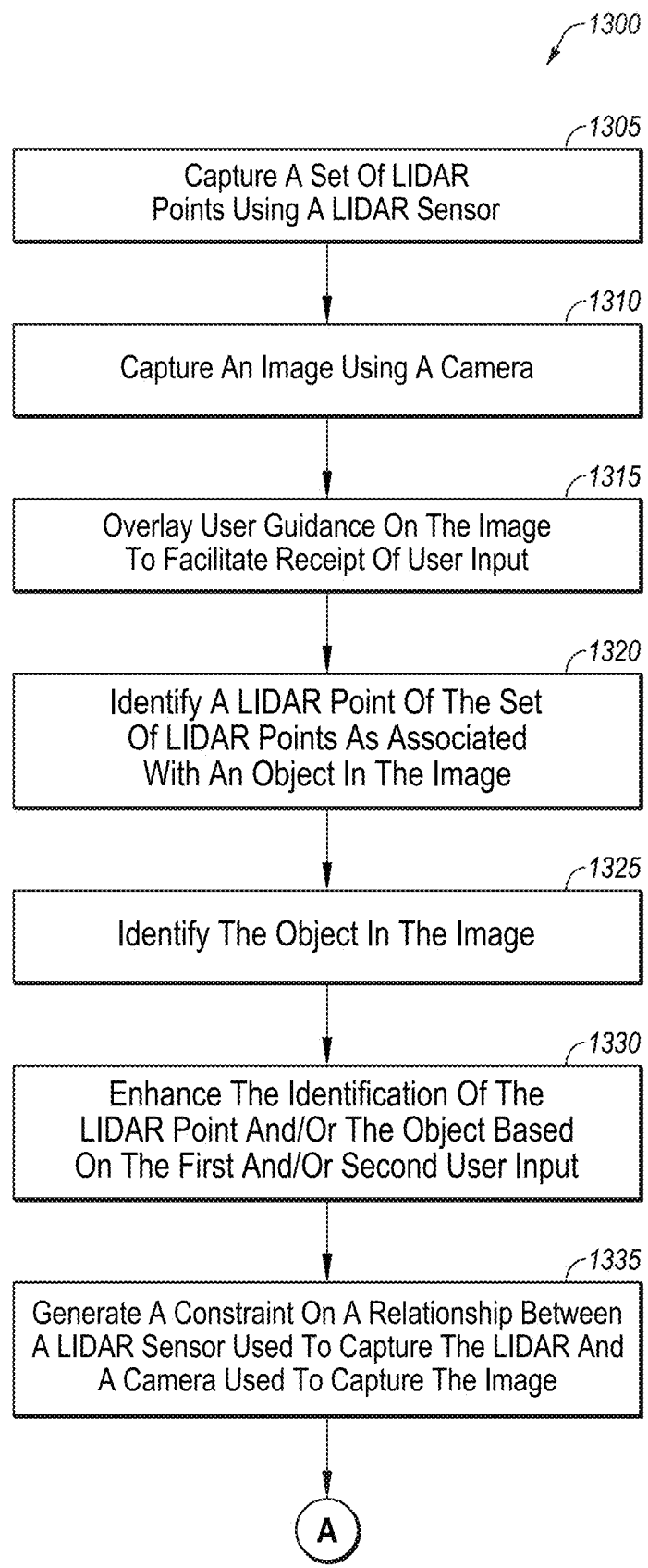
FIGS. 13A and 13B illustrate a flowchart of an example process of interactive sensor calibration for autonomous vehicles.
Figure 13B:
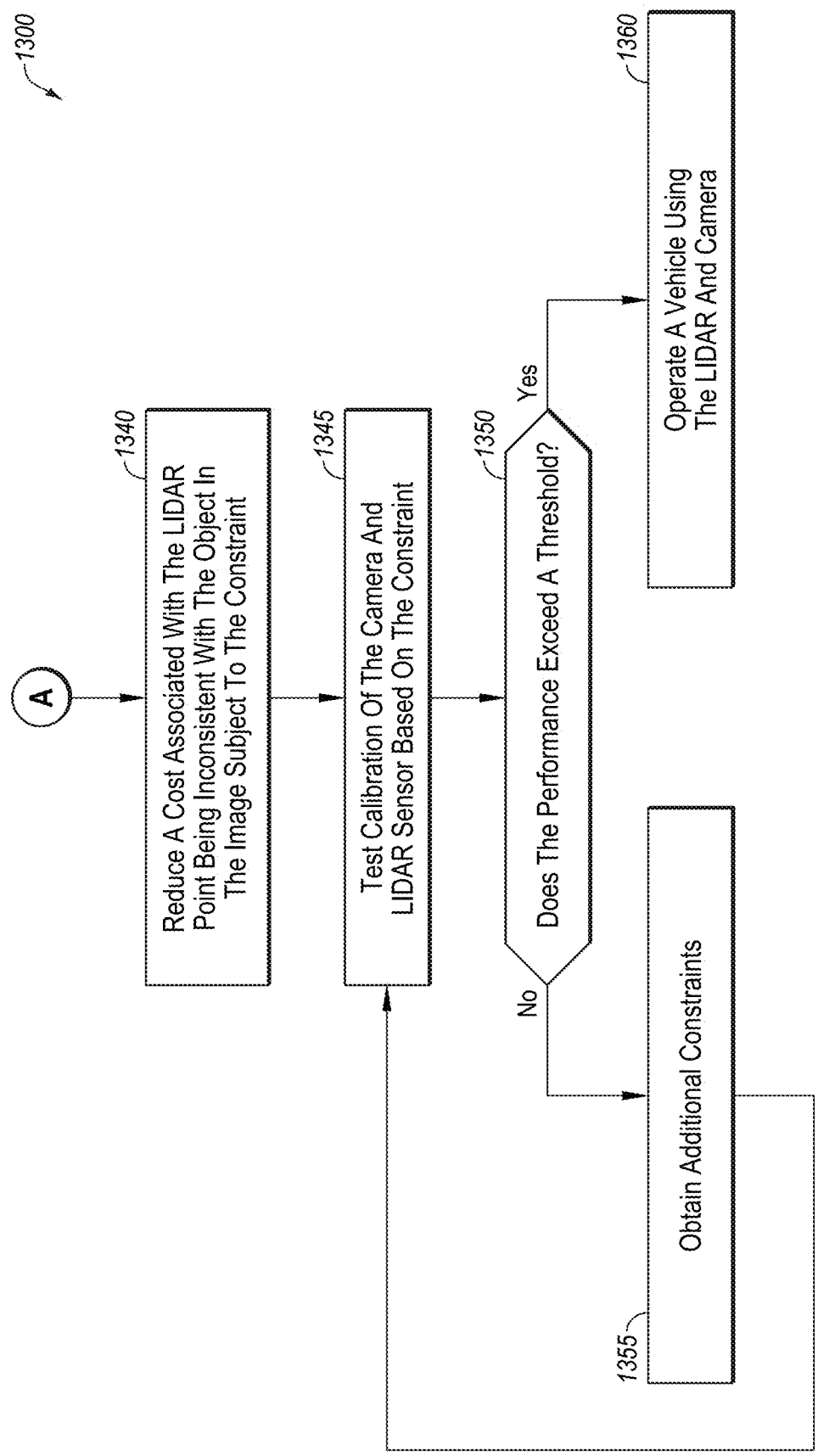

FIGS. 13A and 13B illustrate a flowchart of an example process 1300 of interactive sensor calibration for autonomous vehicles.

At block 1305, a set of LIDAR points may be captured using a LIDAR sensor. Such capturing may occur while an autonomous vehicle is driving or otherwise in normal operation, or while the vehicle is stationary.

At block 1310, an image may be captured using a camera sensor. Such capturing may occur while an autonomous vehicle is driving or otherwise in normal operation, or while the vehicle is stationary.

At block 1315, user guidance may be overlaid on the image to facilitate receipt of user input. For example, a display may present the image with the LIDAR points overlaid on the image. As another example, the user guidance may include instructions of what input is requested from the user (such as those obtained in blocks 1320 and/or 1325).

At block 1320, a first user input may be obtained that identifies a LIDAR point of the set of LIDAR points as associated with an object in the image. For example, the user may identify two LIDAR points on either side of an edge, may identify a LIDAR point on an edge, or may identify LIDAR points that are expected to be within an object of the image.

In some embodiments, rather than obtaining user input to identify the LIDAR point (or points), an automated process may identify the LIDAR point. For example, using a set of training data a deep learning model may be trained to identify one or more LIDAR points at an edge of an object. For example, distinctions between LIDAR points at an edge may include a high contrast in intensity.

At block 1325, a second user input may be obtained identifying the object in the image. For example, the user may identify an edge of the object, the boundary of the object, where the LIDAR points are expected to be in the image, etc.

In some embodiments, rather than obtaining user input to identify the object, an automated process may identify the object in the camera image. For example, using a set of training data a deep learning model may be trained to identify one or more objects in an image. For example, edge detection, object recognition, etc. may be used to identify objects and/or their edges.

At block 1330, the identification of the LIDAR point at block 1320 and/or the object at block 1325 may be enhanced. For example, a localized search based on the first user input of the block 1320 may be used to find a local maximum or local minimum of intensity for the LIDAR point. As another example, edge detection may be performed at a pixel or sub-pixel level in a localized region based on the second user input of the block 1325.

At block 1335, a constraint on a relationship between the LIDAR sensor used to capture the LIDAR points and a camera used to capture the image may be generated. For example, the constraint may represent the correlations between the edge in the 2D image and the LIDAR points in 3D space and/or the inconsistencies therebetween.

At block 1340, a cost associated with the LIDAR point being inconsistent with the object in the image may be reduced subject to the constraint. For example, across multiple collected constraints, a computing system may adjust the transform from camera to LIDAR to reduce the costs of the inconsistencies associated with the constraints.

At block 1345, a calibration of the camera and LIDAR sensor calibration based on the constraint may be tested. In some embodiments, a set of constraints may be obtained prior to the testing of the calibration. For example, at least three, or ten, or twenty constraints may be obtained prior to the testing (although any number may be used). As another example, a certain threshold amount of coverage of the camera area may be obtained prior to the testing.

At block 1350, a determination may be made whether the performance of the calibration exceeds a threshold. If the performance of the calibration does not exceed the threshold, the process may proceed to the block 1355. If the performance of the calibration exceeds the threshold, the process may proceed to the block 1360.

At block 1355, additional constraints may be obtained and/or additional solving subject to the constraints may be performed. After additional calibration based on additional constraints, the process may return to the block 1345 for additional testing of the performance.

At block 1360, after the performance exceeds the threshold, the vehicle may be operated using the LIDAR and the camera.

Computer System Architecture

Figure 14:
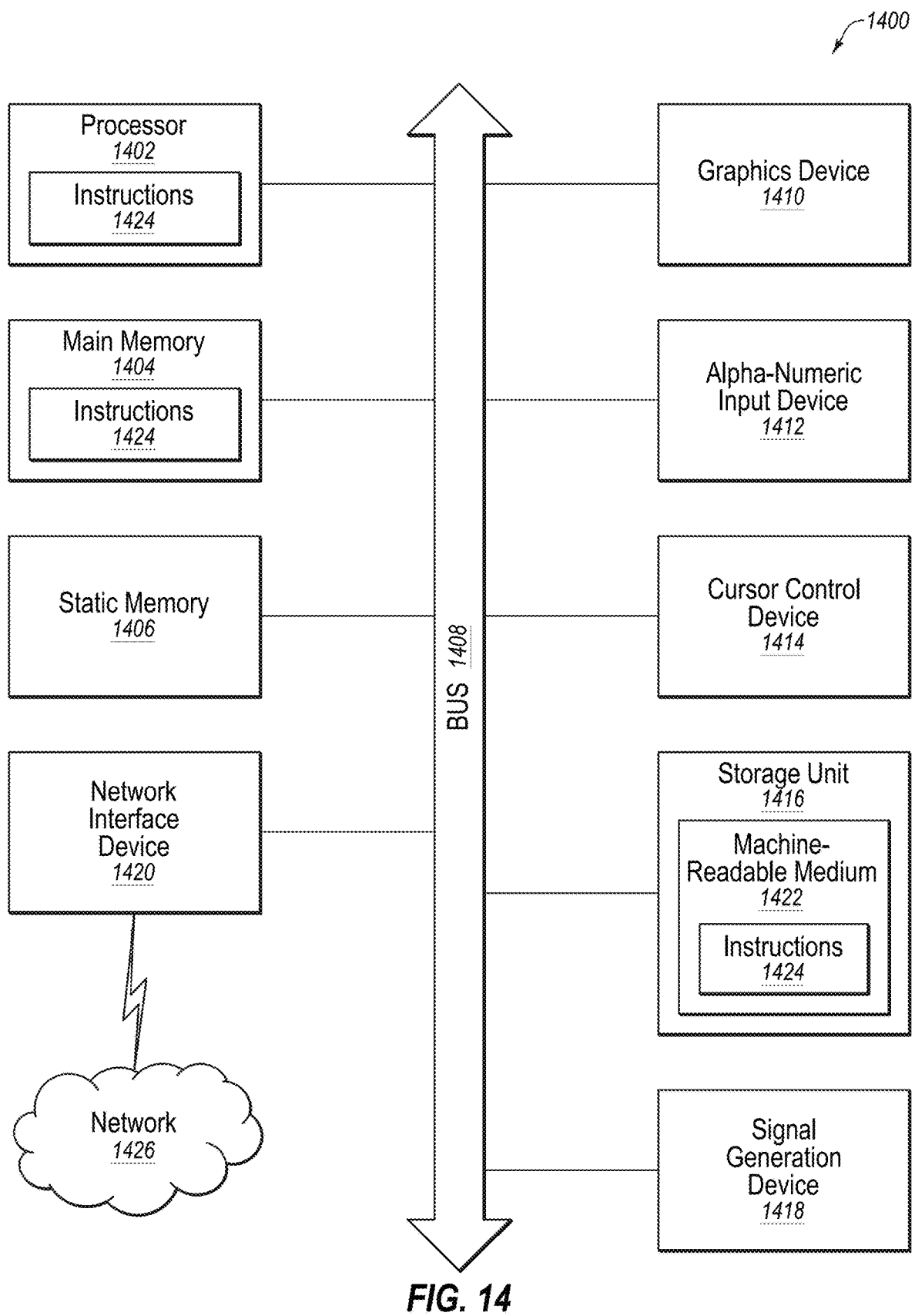
FIG. 14 illustrates an example embodiment of a computing machine that can read instructions from a machine-readable medium and execute the instructions in a processor or controller.

FIG. 14 is a block diagram illustrating components of an example computing system able to read instructions from a machine-readable medium and execute them in a processor (or controller). Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 may be part of or may be any applicable system described in the present disclosure. For example, the online HD map system 110 and/or the vehicle computing systems 120 described above may comprise the computer system 1400 or one or more portions of the computer system 1400. Further, different implementations of the computer system 1400 may include more or fewer components than those described herein. For example, a particular computer system 1400 may not include one or more of the elements described herein and/or may include one or more elements that are not explicitly discussed.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 2408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 2420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    obtaining one or more first user inputs identifying an object depicted in an image and at least partially delineating a shape of the object in the image;
    obtaining one or more second user inputs identifying a subset of light detection and ranging (LIDAR) sensor points of a set of LIDAR points and indicating that the subset of LIDAR sensor points belong within the shape as at least partially delineated in the image;
    determining at least one constraint based at least on the one or more second user inputs, the at least one constraint providing a bounding shape associated with the image that corresponds to the shape as at least partially delineated in the image;
    determining a spatial transform between the image and the set of LIDAR points based at least on alignment of one or more LIDAR points of the subset of LIDAR points with the object in the image, the alignment being based at least on a cost reduction process performed using the at least one constraint in which LIDAR points of the subset of LIDAR points that are overlaid on the image and outside of the bounding shape are assigned a cost based at least on distance from the bounding shape; and
    adjusting a relationship between the LIDAR sensor used to obtain the set of LIDAR points and a camera used to obtain the image based at least on the spatial transform.

2. The method of claim 1, wherein a number of constraints used in determining the spatial transform is based at least on a target amount of error in the spatial transform.

3. The method of claim 1, further comprising overlaying a user guidance on the image to facilitate the one or more user inputs.

4. The method of claim 3, wherein the user guidance includes one or more visual indicators of whether a given point of the set of LIDAR points is within at least one respective region of the image corresponding to the at least one object or outside of the at least one respective region corresponding to the at least one object.

5. The method of claim 3, wherein the user guidance includes one or more visual indicators of regions within a view of the image as depicted on a user interface.

6. The method of claim 1, further comprising at least one of:
    enhancing the at least one subset of LIDAR points by at least performing a localized search of the set of LIDAR points for intensity based at least on the one or more user inputs; or
    enhancing the identifying of the at least one object by at least performing edge detection at a pixel or sub-pixel level localized based at least on the one or more user inputs.

7. The method of claim 1,
    wherein a particular object of the at least one object includes an edge depicted in the image;
    wherein the one or more user inputs include identification of a first point of the set of LIDAR points on a first side of the edge and a second point of the set of LIDAR points on a second side of the edge as depicted in the image with the set of LIDAR points overlaid thereon; and
    wherein the one or more user inputs include drawing a line along the edge.

8. The method of claim 1,
    wherein a particular object of the at least one object includes an edge depicted in the image;
    wherein the one or more user inputs include identification of a first point of the set of LIDAR points that is on the edge as depicted in the image with the set of LIDAR points overlaid thereon; and
    wherein the one or more user inputs include indicating a region within the image to which the first point corresponds.

9. The method of claim 1,
    wherein a particular object of the at least one object includes one of a street sign or pole depicted in the image; and
    wherein the one or more user inputs include identification of a plurality of points of the set of LIDAR points that fall within the street sign or pole as depicted in the image with the set of LIDAR points overlaid thereon;
    wherein the one or more user inputs include drawing a particular shape corresponding to the street sign or pole; and
    wherein a particular bounding shape corresponding to the particular object is based at least on the particular shape obtained from the one or more user inputs.

10. The method of claim 1, further comprising:
    testing calibration of the camera and LIDAR sensor based at least on the relationship between the LIDAR sensor and the camera; and iteratively obtaining additional constraints and adjusting the relationship between the LIDAR sensor and the camera until the calibration satisfies a performance threshold.

11. The method of claim 1, wherein the obtaining of the one or more user inputs is such that the one or more user inputs are received via a user interface with at least some of the LIDAR points overlaid on the image.

12. A processor comprising:
processing circuitry to cause performance of operations, the operations comprising:
obtaining one or more first user inputs identifying at least one object depicted in an image and at least partially delineating a shape of the object in the image;
obtaining one or more second user inputs identifying a subset of light detection and ranging (LIDAR) sensor points of a set of LIDAR points and indicating that the subset of LIDAR sensor points belong within the shape as at least partially delineated in the image;
determining at least one constraint based at least on the one or more second user inputs, the at least one constraint providing a bounding shape associated with the image that corresponds to the shape as at least partially delineated in the image; and
adjusting a calibration between a camera used to capture the image and a LIDAR sensor used to capture the set of LIDAR points based at least on alignment of one or more LIDAR points of the subset of LIDAR points with the object in the image, the alignment being based at least on a cost reduction process performed using the at least one constraint in which LIDAR points of the subset of LIDAR points that are overlaid on the image and outside of the bounding shape are assigned a cost based at least on distance from the bounding shape.

13. The processor of claim 12, wherein the operations further comprise:
capturing the set of LIDAR points using the LIDAR sensor while driving; and
capturing the image using the camera while driving.

14. The processor of claim 12, wherein the operations further comprise overlaying a user guidance on the image to facilitate the one or more user inputs.

15. The processor of claim 14, wherein the user guidance includes one or more visual indicators of whether a given point of the set of LIDAR points is within at least one respective region of the image corresponding to the at least one object or outside of the at least one respective region corresponding to the at least one object.

16. The processor of claim 14, wherein the user guidance includes one or more visual indicators of regions within a view of the image as depicted on a user interface.

17. The processor of claim 12, wherein the operations further comprise at least one of:
enhancing the at least one subset of LIDAR points by at least performing a localized search of the set of LIDAR points for intensity based at least on the one or more user inputs; or
enhancing the identifying of the at least one object by at least performing edge detection at a pixel or sub-pixel level localized based at least on the one or more user inputs.

18. The processor of claim 12,
wherein a particular object of the at least one object includes an edge depicted in the image;
wherein the one or more user inputs include identification of a first point of the set of LIDAR points on a first side of the edge and a second point of the set of LIDAR points on a second side of the edge as depicted in the image with the set of LIDAR points overlaid thereon; and
wherein the one or more user inputs include drawing a line along the edge.

19. The processor of claim 12,
wherein a particular object of the at least one object includes an edge depicted in the image;
wherein the one or more user inputs include identification of a first point of the set of LIDAR points that is on the edge as depicted in the image with the set of LIDAR points overlaid thereon; and
wherein the one or more user inputs include indicating a region within the image to which the first point corresponds.

20. The processor of claim 12,
wherein a particular object of the at least one object includes one of a street sign or pole depicted in the image; and
wherein the one or more user inputs include identification of a plurality of points of the set of LIDAR points that fall within the street sign or pole as depicted in the image with the set of LIDAR points overlaid thereon;
wherein the one or more user inputs include drawing a particular shape corresponding to the street sign or pole; and
wherein a particular bounding shape corresponding to the particular object is based at least on the particular shape obtained from the one or more user inputs.

21. The processor of claim 12, wherein the operations further comprise:
testing the calibration of the camera and LIDAR sensor; and
iteratively obtaining additional constraints and adjusting a spatial transform between the LIDAR sensor and the camera until the calibration satisfies a performance threshold.

22. The processor of claim 12, wherein the obtaining of the one or more user inputs is such that the one or more user inputs are received via a user interface with at least some of the LIDAR points overlaid on the image.

23. A system comprising:
one or more processors comprising processing circuitry configured to cause performance of operations, the operations comprising:
automatically identifying that a subset of at least one light detection and ranging (LIDAR) point in a set of LIDAR points is associated with an object in an image;
automatically identifying the object in the image;
determining, based at least on the at least one LIDAR point being identified as being associated with the object, a constraint on a relationship between a LIDAR sensor used to capture the set of LIDAR points and a camera used to capture the image, the constraint providing a bounding shape associated with the image that includes the object disposed therein;
determining a spatial transform between the image and the set of LIDAR points based at least on alignment of one or more LIDAR points of the set of LIDAR points with the object in the image, the alignment being based at least on a cost reduction process performed using the constraint in which LIDAR points of the subset of LIDAR points that are overlaid on the image and outside of the bounding shape are assigned a cost; and adjusting the relationship between the LIDAR sensor and the camera based at least on the spatial transform.

24. The system of claim 23, wherein the operations further comprise:

capturing the set of LIDAR points using the LIDAR sensor while driving; and capturing the image using the camera while driving.

25. The system of claim 23, wherein the automatically identifying of the object in the image includes performing edge detection at a pixel or sub-pixel level.

26. The system of claim 23, wherein the operations further comprise:

testing calibration of the camera and LIDAR sensor based at least on the relationship between the LIDAR sensor and the camera; and iteratively obtaining additional constraints and adjusting the relationship between the LIDAR sensor and the camera until the calibration satisfies a performance threshold.

27. The system of claim 23, wherein the automatically identifying of the at least one LIDAR point includes performing localized searching of the set of LIDAR points based at least on intensity.

* * * * *